(12) United States Patent
Sugawara et al.

(10) Patent No.: US 7,353,992 B2
(45) Date of Patent: Apr. 8, 2008

(54) EXTERNAL STORAGE DEVICE

(75) Inventors: Norio Sugawara, Tochigi (JP); Takashi Ando, Tochigi (JP); Shigeru Kasuya, Tochigi (JP)

(73) Assignee: Sony Corporation, Tokyo (JP)

( * ) Notice: Subject to any disclaimer, the term of this patent is extended or adjusted under 35 U.S.C. 154(b) by 570 days.

(21) Appl. No.: 10/525,904

(22) PCT Filed: Jun. 28, 2004

(86) PCT No.: PCT/JP2004/009456

§ 371 (c)(1),
(2), (4) Date: Feb. 25, 2005

(87) PCT Pub. No.: WO2005/001755

PCT Pub. Date: Jan. 6, 2005

(65) Prior Publication Data

US 2005/0257071 A1   Nov. 17, 2005

(30) Foreign Application Priority Data

Jun. 30, 2003 (JP) ............................. 2003-188719

(51) Int. Cl.
*G06K 17/00* (2006.01)
(52) U.S. Cl. ............... 235/386; 235/492; 235/451; 235/382; 340/5.83; 340/5.8; 365/51
(58) Field of Classification Search ............... 235/495, 235/486, 451, 382; 365/51; 361/727
See application file for complete search history.

(56) References Cited

U.S. PATENT DOCUMENTS 6,592,031 B1   7/2003   Klatt

FOREIGN PATENT DOCUMENTS

| EP | 1 006 479 | 6/2000 |
| JP | 06-312593 | 11/1994 |
| JP | 3060424 | 6/1999 |
| JP | 11-312225 | 11/1999 |
| JP | 2000-215296 | 8/2000 |
| JP | 2003-281490 | 10/2003 |
| WO | WO 98 38567 | 9/1998 |

*Primary Examiner*—Michael G. Lee
*Assistant Examiner*—Kristy A. Haupt
(74) *Attorney, Agent, or Firm*—Frommer Lawrence & Haug LLP; William S. Frommer

(57) ABSTRACT

Providing a reliable, durable external storage apparatus that is capable of disposing a sensor for fingerprint authentication on its surface of the housing with a simple structure.

With respect to a memory substrate 12 to be mounted a semiconductor memory 21, an image sensor 20 on which a sensing surface 20*a* is provided for fingerprint authentication is mounted at a surface on the opposite side to a surface where a connector 24 is mounted so as to dispose the image sensor 20 directly under a window 31. By adapting a structure such that a protective plate 13C of the substrate holder 13 is held by a holding section 58 in a vertical direction, the memory substrate 12 is protected from damages by external force acting on the substrate holder 13.

7 Claims, 25 Drawing Sheets

EXTERNAL STORAGE DEVICE

TECHNICAL FIELD

The present invention relates to an external storage apparatus capable of being exchanged or being portable as an external storage medium for a personal computer etc. and specifically relates to an external storage apparatus capable to improving the security of stored data through the addition of a fingerprint authentication function.

BACKGROUND ART

Conventionally, storage apparatuses or storage elements capable of recording and storing various data or audio/images etc. have been internally mounted in equipment cases of personal computers etc. or have been capable of being arbitrarily detached (or attached) to equipment cases.

In a case where, for example, flexible disc devices etc. are taken as external storage apparatuses capable of being freely removed from the equipment, attaching and removing is possible with one movement, and various data is possible to record and store in a manner appropriately corresponding to the purpose and object etc. This has the substantial advantage that arrangement etc. can be carried out in a straightforward manner.

However, in the case of a flexible disc, with respect to recording various data, not only is reliability insufficient, but access time is also slow. Further, when apparatuses are made more compact in accordance with the tendency to develop miniaturized, the surface area of the storage medium inevitably becomes smaller and storage capacity is reduced, with this placing limits on achieving miniaturization with a high-capacity.

On the other hand, when semiconductor memory is used as an external storage apparatus, there is the advantage that it is possible to resolve problems with flexible discs such as problems with the reliability of recording and storing of various data and the access time being slow.

The card-type apparatus disclosed in, for example, Japanese Patent application Publication No. Hei. 6-312593 is well known as an external storage apparatus using semiconductor memory of the related art. However, with card-type external storage apparatuses, this is detrimental to the versatility of drive devices reading and writing data stored in this storage apparatuses.

The present applicant has therefore formerly proposed an external storage apparatus utilized through insertion in a USB (Universal Serial Bus) port etc. of a personal computer (Japanese Patent Application No. 2002-187534).

This external storage apparatus does not require a dedicated drive device and is capable of storing and reading data simply through insertion in a USB port typically provided at a personal computer. A configuration for the above external storage apparatus is shown in FIG. 29 to FIG. 31.

An external storage apparatus 1 of the related art is configured from a combination of four components of a case 2 made of synthetic resin, a cap 4, a substrate holder 5, and a memory substrate 6, so as to be small and lightweight. In this product, the case 2, substrate holder 5 and memory substrate 6 are integrally fixed, and the cap 4 is freely attachable and detachable to and from the substrate holder 5.

Semiconductor memory is mounted as a storage element at the memory substrate 6, and is integrally formed with the case 2 via the substrate holder 5.

A connector 3 conforming to the USB standard is fitted at one edge of the memory substrate 6 so as to project outwards from the substrate holder 5. The cap 4 is installed at the substrate holder 5 with the purpose of protecting the connector 3 when the external storage apparatus 1 is not in use.

On the other hand, the inappropriate outflow or theft of data files stored in a computer etc. accompanying the development of computer systems in recent years is becoming a large problem in society. As a result, in order to prevent utilization of the data by people other than the owner of the data, the addition of data file encryption and password authentication technology, and more recently the introduction of technology limiting the access of people other than the owner by storing physical characteristics such as fingerprints or voiceprints of the data owner, has started.

For example, Japanese Patent Application Publication No. 2000-298529 discloses a computer system implementing fingerprint authentication of users in the event of using a computer. Further, Japanese Patent No. 3338417 discloses an electronic data storage medium equipped with a fingerprint authentication function for verifying whether or not the authority to access data files stored on a memory device is held.

If a fingerprint authentication function is added to the USB-connected external storage apparatus of the aforementioned configuration, it is possible to further improve the security function for the stored data. In this case, it is necessary to ensure ease of handling and durability in the event of an authentication operation while maintaining the original features of being small and lightweight when a fingerprint authentication function is added to the external storage apparatus 1.

The fingerprint authentication operation is carried out by the user putting their finger on an image sensor (imager) for authentication but it is necessary for the configuration to be such that a sensing surface of an image sensor is arranged in close proximity to a casing surface so that appropriate authentication processing can be carried out in a stable manner. In this case, when a special mounting structure is adopted to arrange the image sensor at a casing surface section, complexity of the device structure, increased weight and thickness, and increases in cost due to an increase in the number of parts is invited. There are therefore demands for a configuration where an image sensor can be arranged at a casing surface section while using a simple configuration.

Further, in addition to ensuring reliability and durability of the external storage apparatus over long periods, it is also necessary to protect a memory substrate within the casing from stress incurred during fingerprint authentication operations. To this end, a casing structure capable of ensuring that pressure applied during authentication operations is received by the whole of the casing so as to alleviate the load on the memory substrate is desired.

The present invention provides a reliable, durable external storage apparatus capable of performing appropriate, stable fingerprint authentication processing while avoiding increased complexity of structure and increases in weight and thickness.

DISCLOSURE OF THE INVENTION

The present invention has been made under the aforementioned circumstances and provides an external storage apparatus characterized by an image sensor for fingerprint authentication use being mounted on a memory substrate at a surface on an opposite side to a mounting surface for an external connection terminal.

The memory substrate is arranged at a position offset from an axial center position when lining up the external connection terminal with an axial center position of the substrate holder. By mounting an image sensor at a surface on an outer side of the memory substrate arranged at the aforementioned offset position, i.e. by mounting the image sensor on a surface on the opposite side to the external connection terminal mounting surface of the memory substrate, it is possible to arrange the image sensor in the vicinity of a surface section of the substrate holder. It is therefore possible to arrange the image sensor at a surface section of the substrate holder without adopting a special mounting structure.

Further, the external storage apparatus of the present invention is such that the substrate holder is equipped with a protective plate formed with a window positioned directly above the image sensor so as to expose a sensing surface to the outside, with a holding mechanism holding the protective plate in a vertical direction.

With this configuration, it is possible to achieve a configuration where external force received by the protective plate is received by the substrate holder and case so that the internal memory substrate is not subjected to excessive stress due to deformation of the substrate holder, etc. Moreover, loads applied by a user in the event of a fingerprint authentication operation etc. are dispersed between the substrate holder and the case and protection of the memory substrate is therefore achieved. As a result, reliability of the apparatus is ensured and durability is increased.

BEST MODE FOR CARRYING OUT THE INVENTION

The following is a description with reference to the drawings of embodiments of the present invention.

Figure 1:
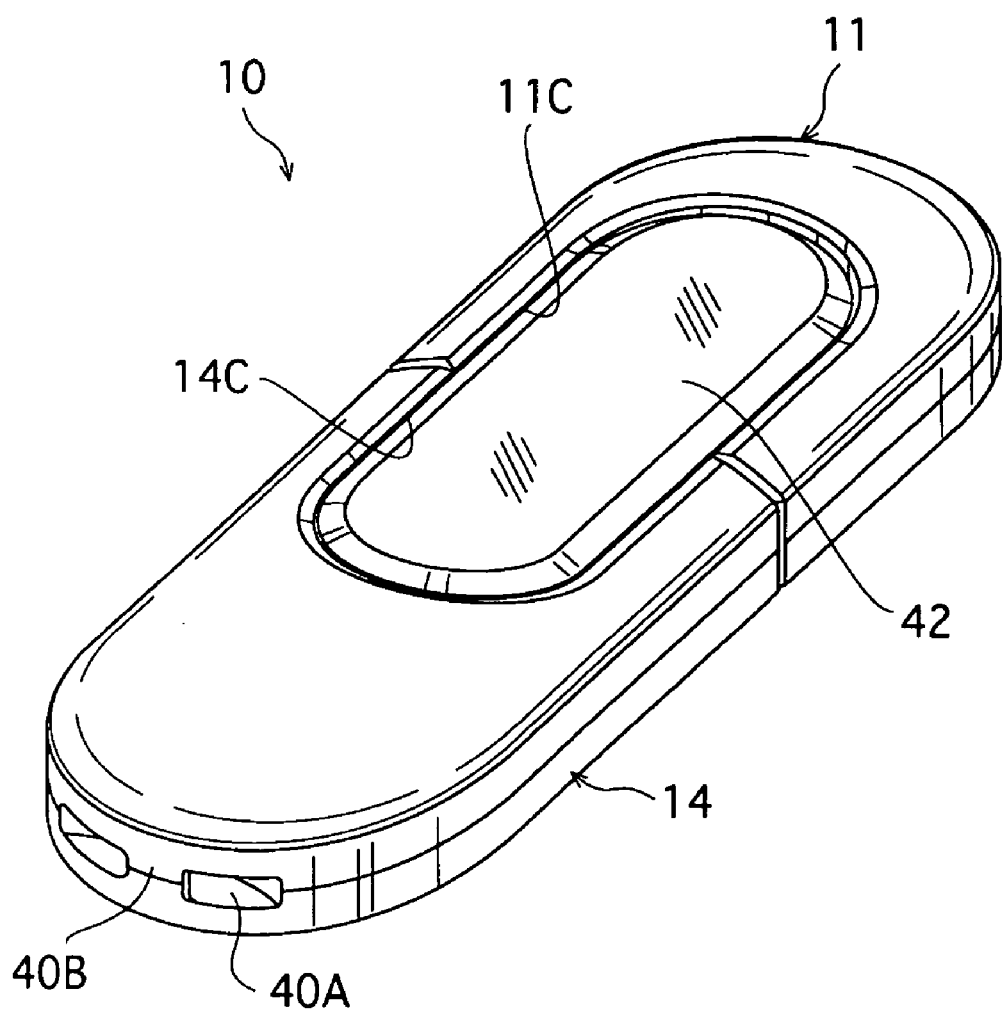
FIG. 1 is a perspective view showing the whole of the upper surface side of an external storage apparatus 10 of an embodiment of the present invention.
Figure 2:
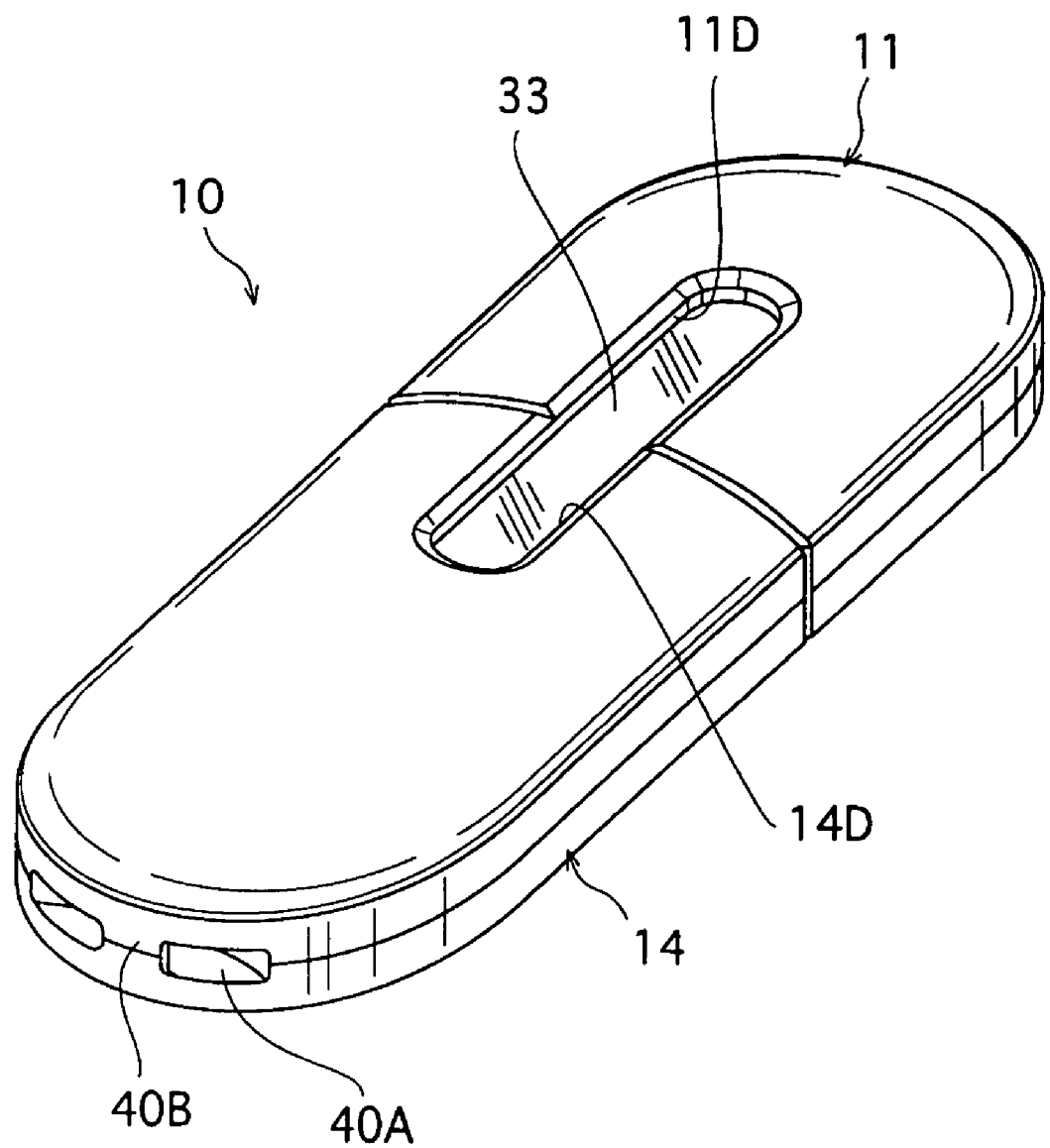
FIG. 2 is a perspective view showing the whole of the lower surface side of the external storage apparatus 10.
Figure 3:
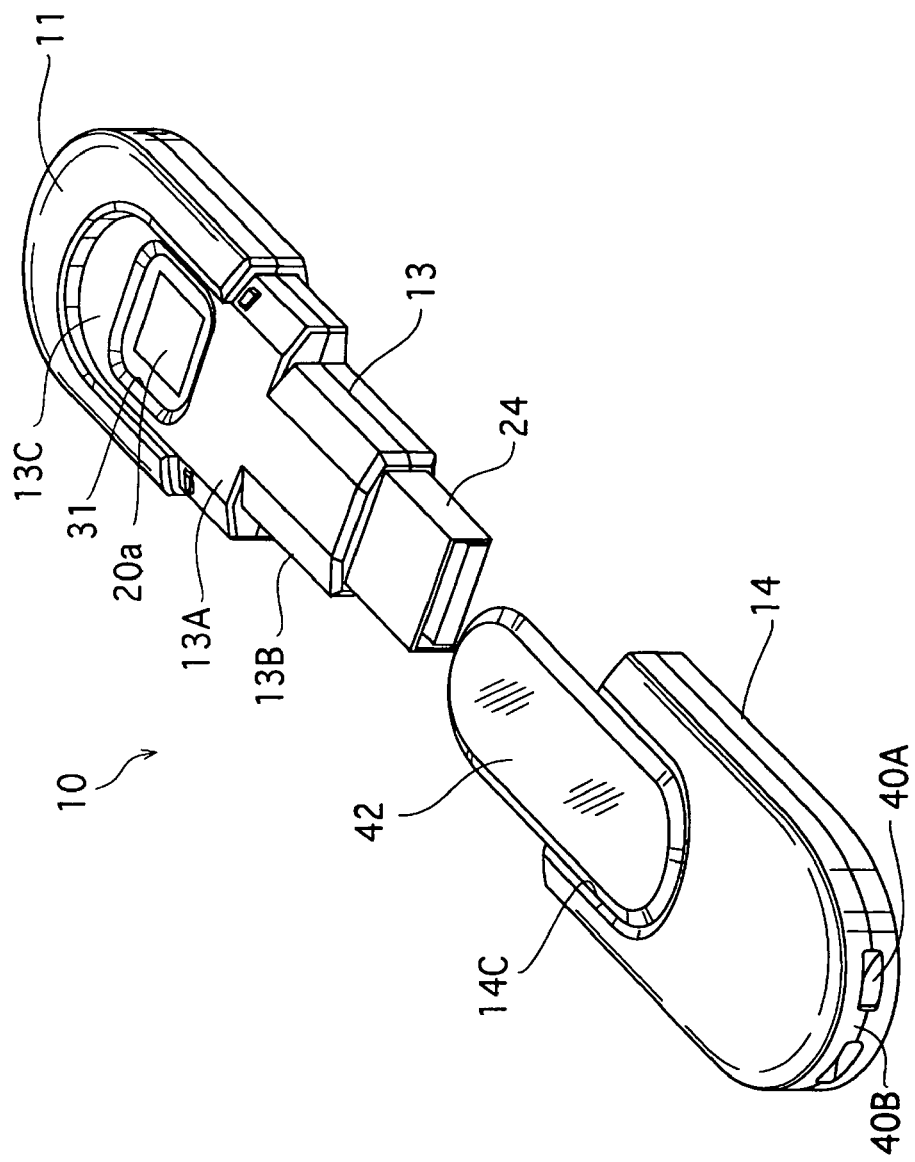
FIG. 3 is a perspective view of the external storage apparatus 10 as viewed with a cap 14 removed.
Figure 6:
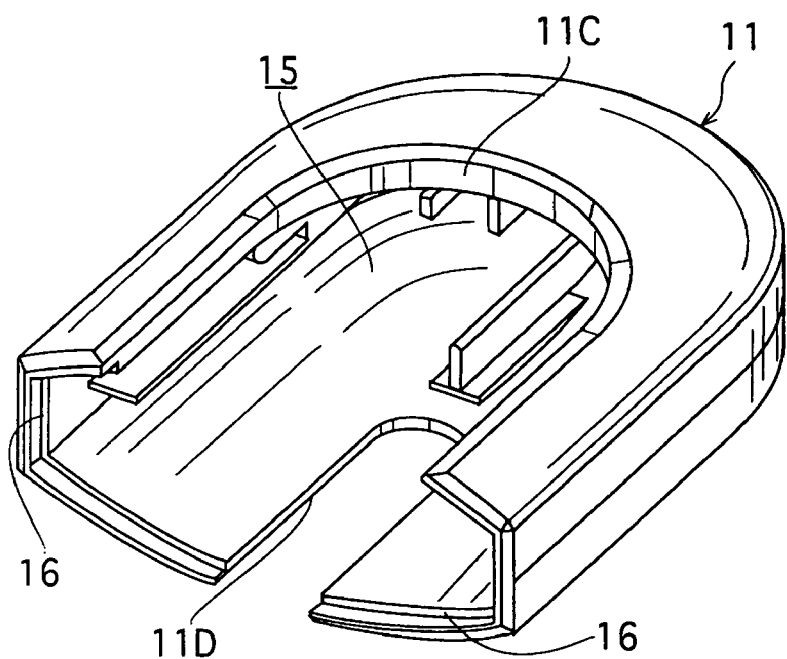
FIG. 6 is a perspective view of the upper surface side of a main body 11.
Figure 7:
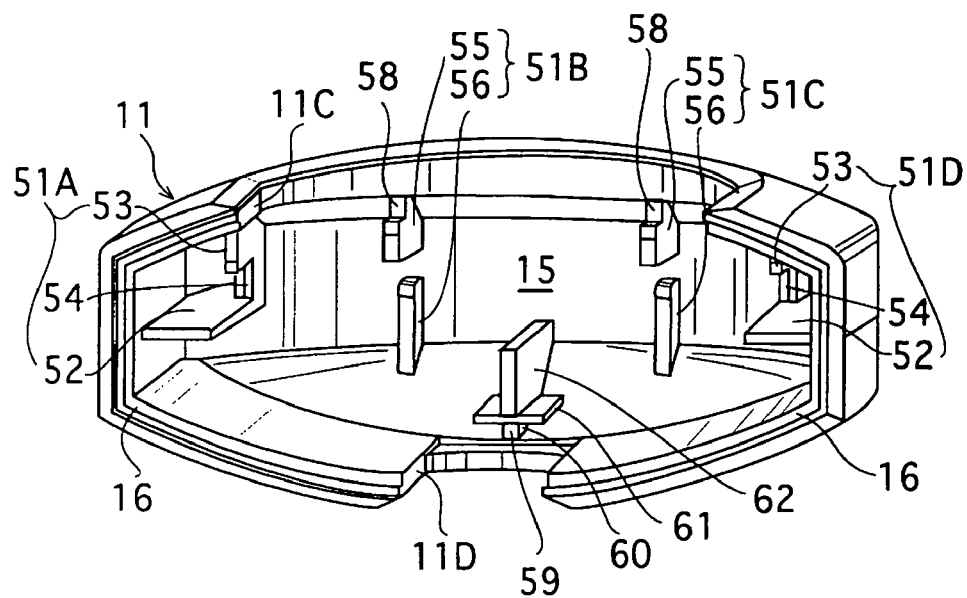
FIG. 7 is a perspective view showing an internal configuration of the main body 11.
Figure 8:
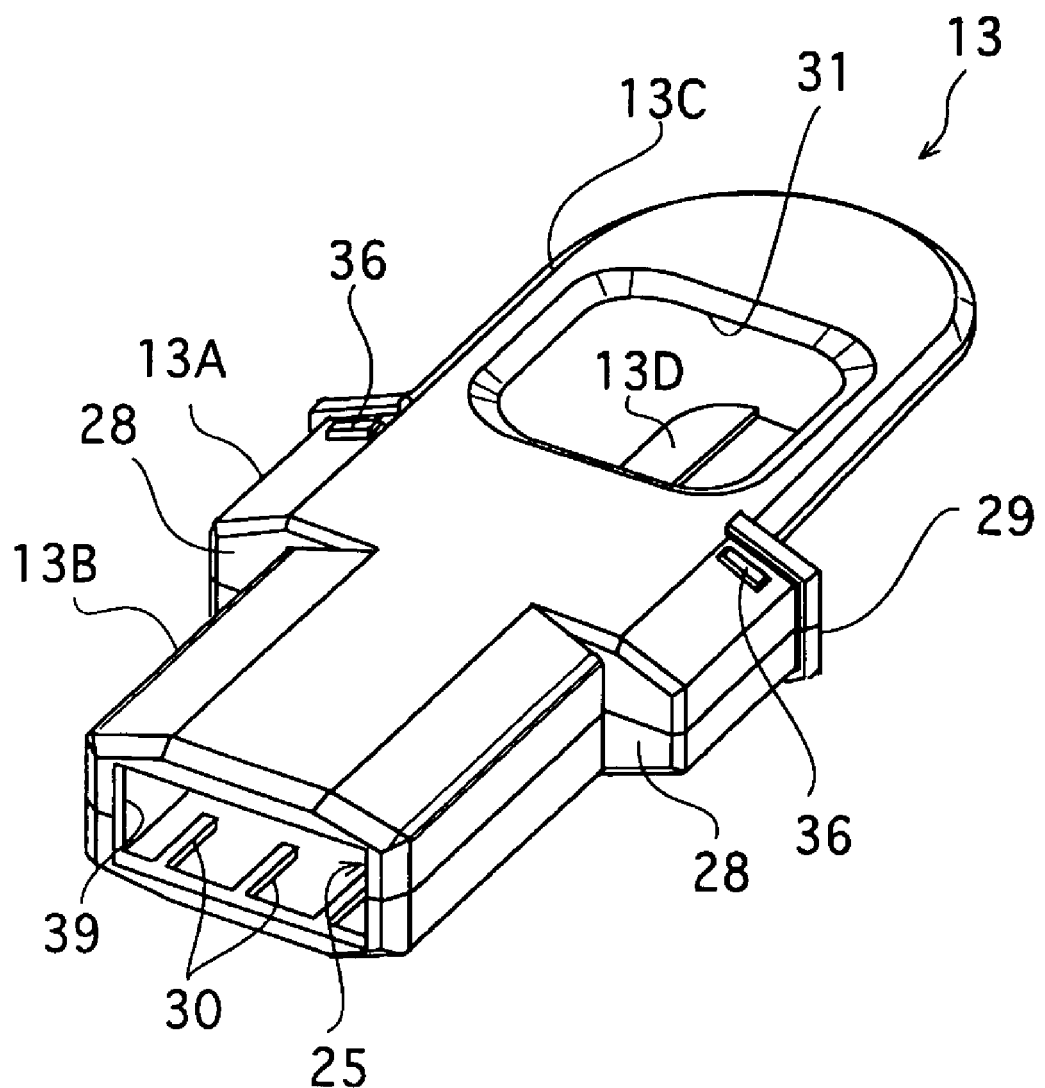
FIG. 8 is a perspective view of the upper surface side of a substrate holder 13.
Figure 9:
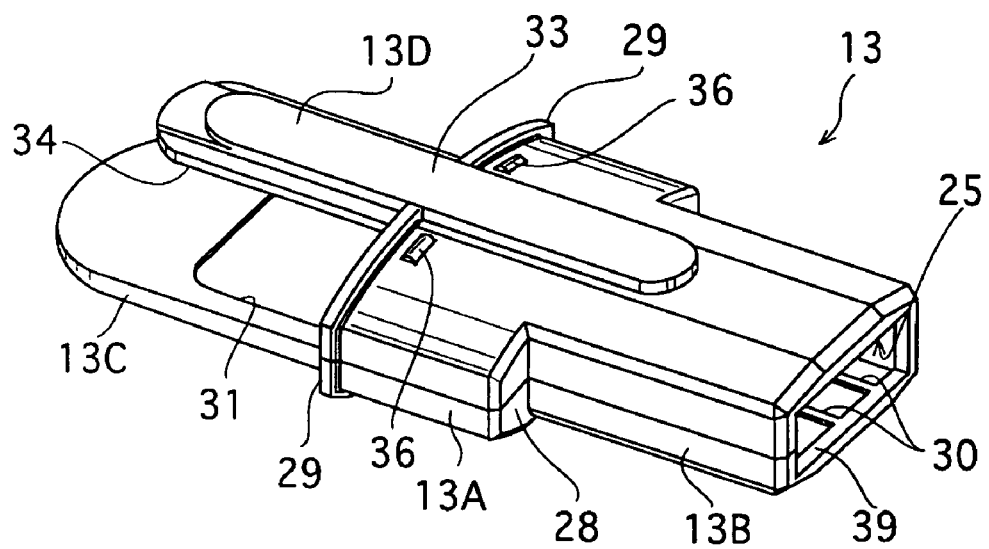
FIG. 9 is a perspective view of the lower surface side of the substrate holder 13.
Figure 10:
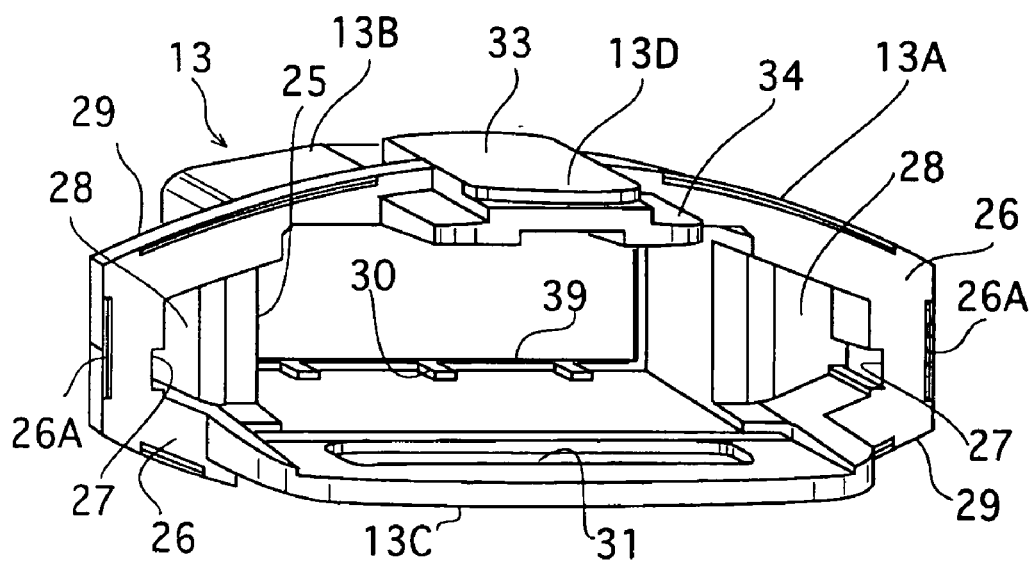
FIG. 10 is a perspective view showing an internal configuration of a substrate through-hole 25.
Figure 11:
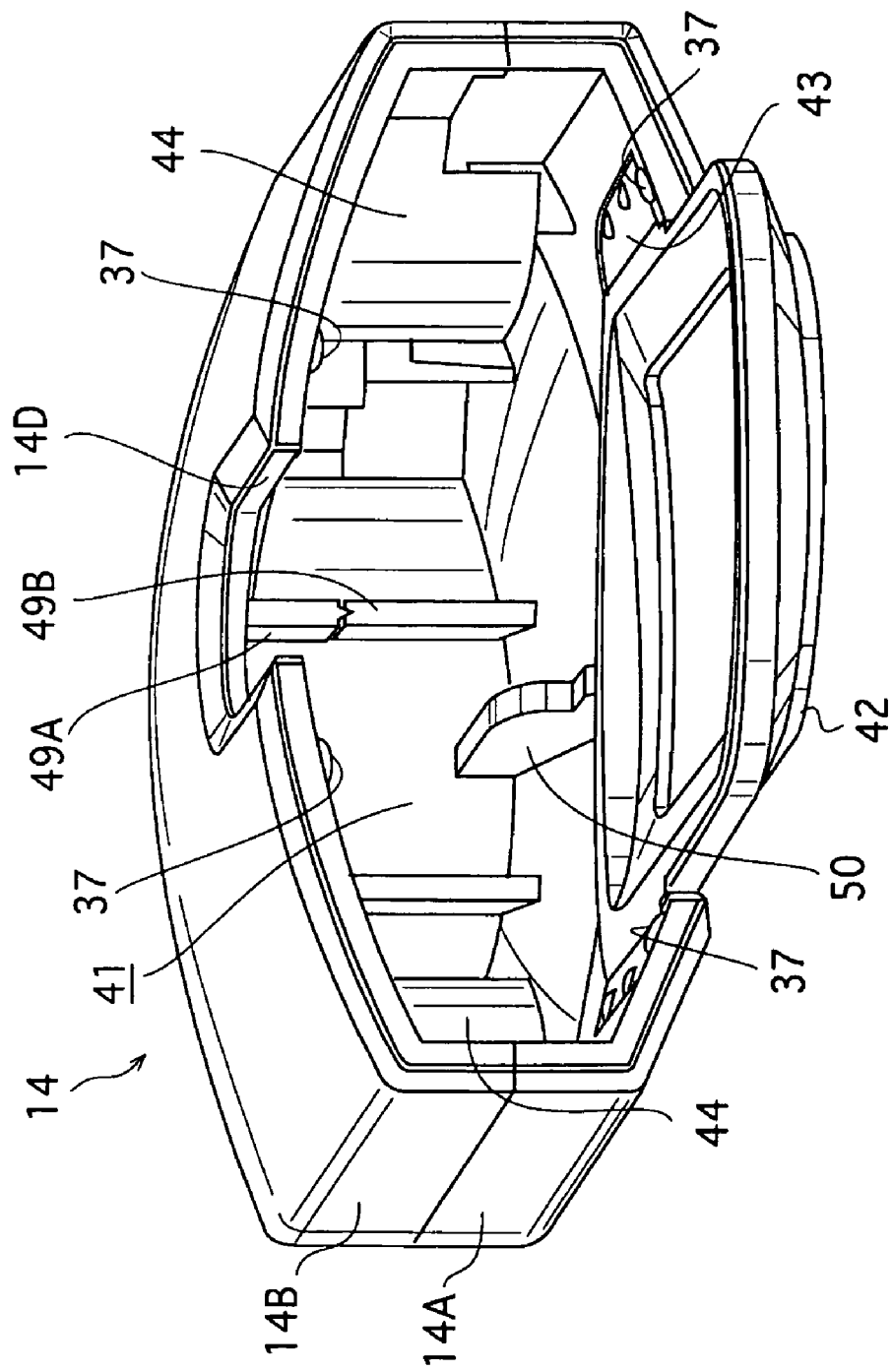
FIG. 11 is a perspective view showing an internal configuration of a cap 14.
Figure 12:
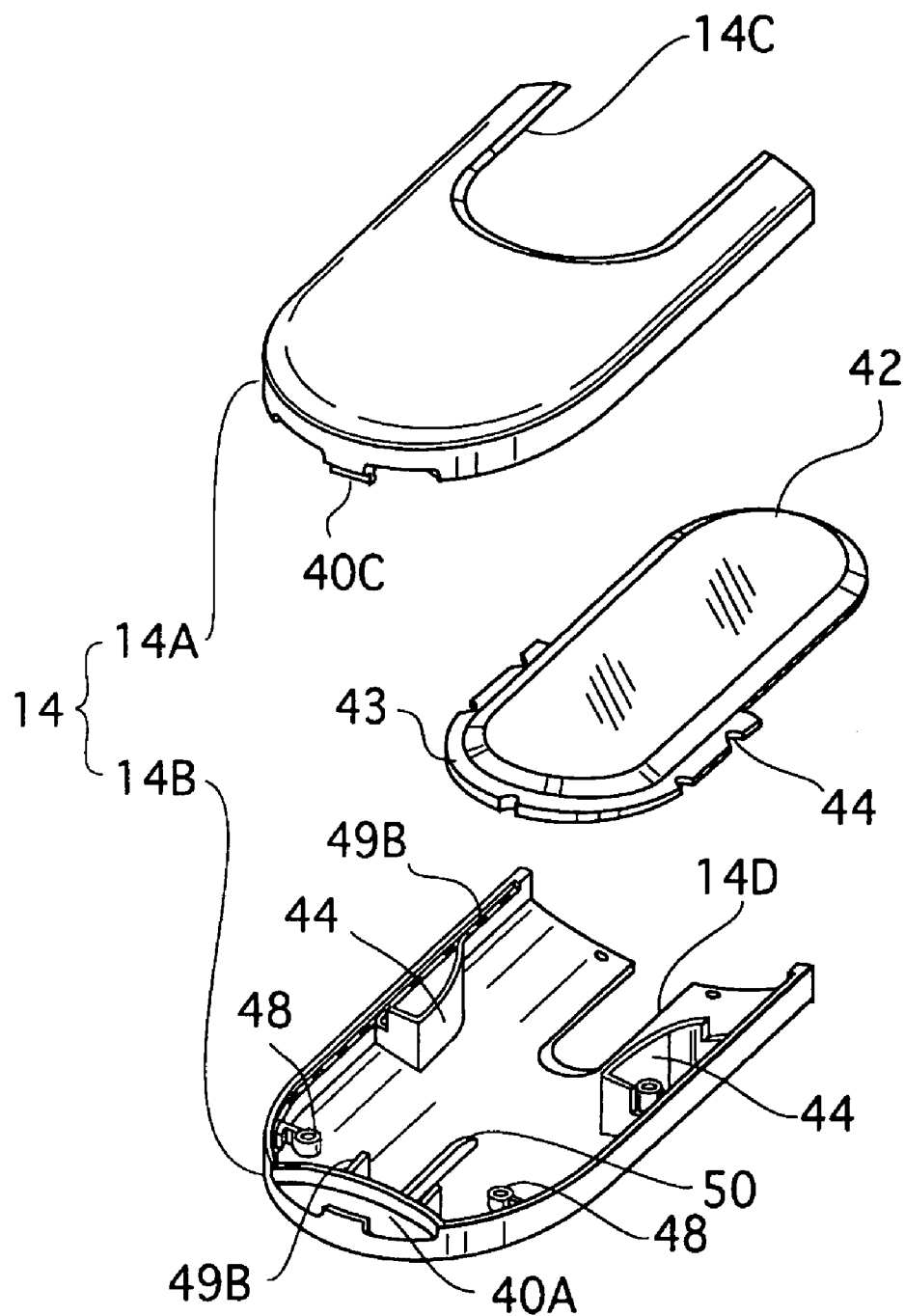
FIG. 12 is an exploded perspective view of the cap 14 as viewed from the upper surface side.
Figure 13:
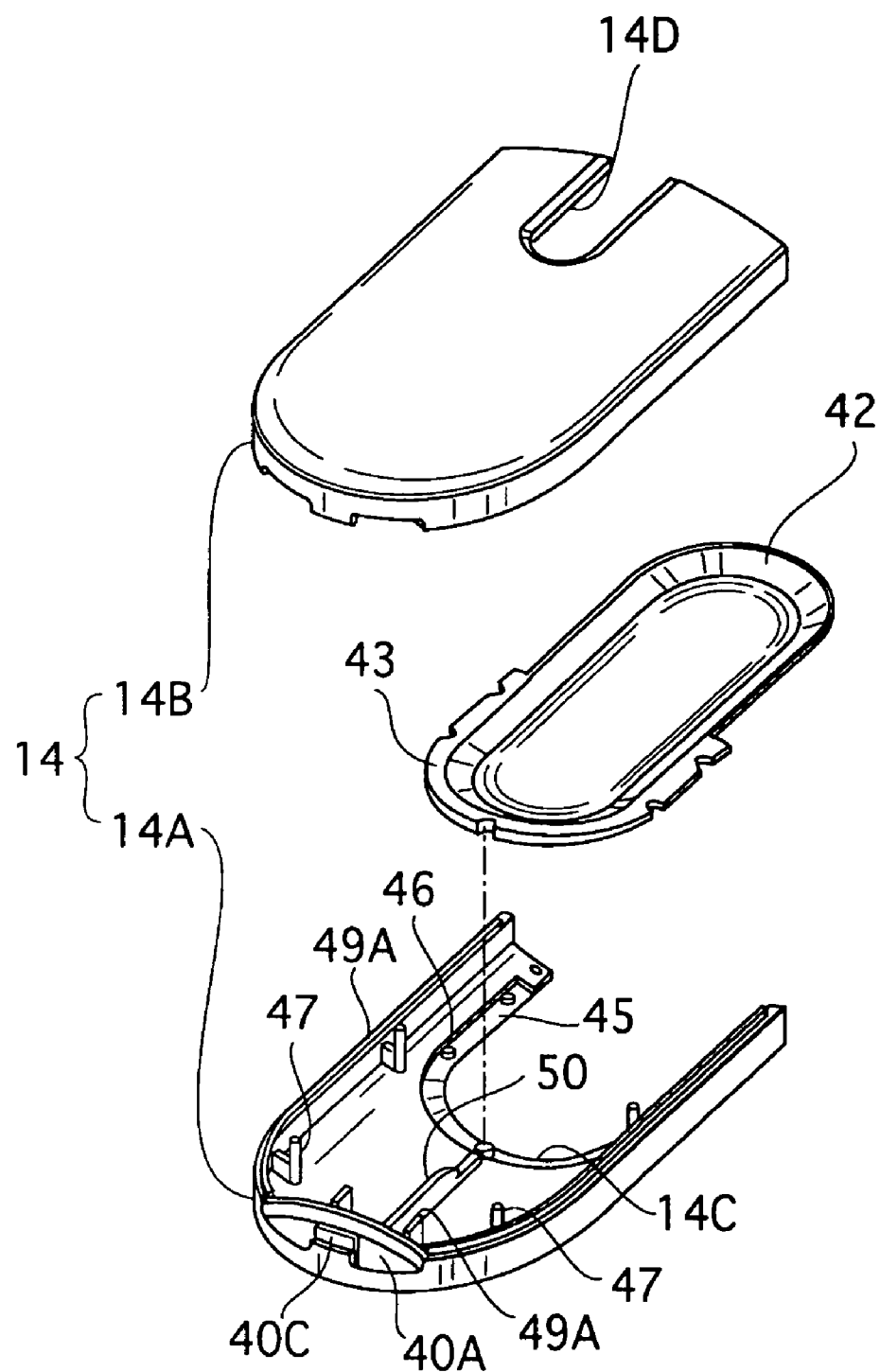
FIG. 13 is an exploded perspective view of the cap 14 as viewed from the lower surface side.

FIG. 1 to FIG. 13 show an external storage apparatus 10 of an embodiment of the present invention. Here, FIG. 1 is an upper surface side overall perspective view of the external storage apparatus 10, FIG. 2 is a lower surface side overall perspective view of the same, FIG. 3 is an upper surface side perspective view of the external storage apparatus 10 as viewed with a cap 14 removed, FIG. 4 is an exploded perspective view of the external storage apparatus 10, FIG. 5 is a side cross-sectional view of the same, FIG. 6 is an upper surface side perspective view of a main body 11, FIG. 7 is a perspective view showing an internal configuration for the main body 11, FIG. 8 is an upper surface side perspective view of a substrate holder 13, FIG. 9 is a lower surface side perspective view of the same, FIG. 10 is a perspective view showing an internal configuration of a substrate through-hole, FIG. 11 is a perspective view showing an internal configuration of a cap 14, FIG. 12 is an exploded perspective view of the cap 14 as viewed from above, and FIG. 13 is an exploded perspective view for viewing the same from the lower surface side.

The external storage apparatus 10 is comprised mainly of the main body 11, a memory substrate 12, the substrate holder 13 and the cap 14 (FIG. 1 to FIG. 4).

Figure 4:
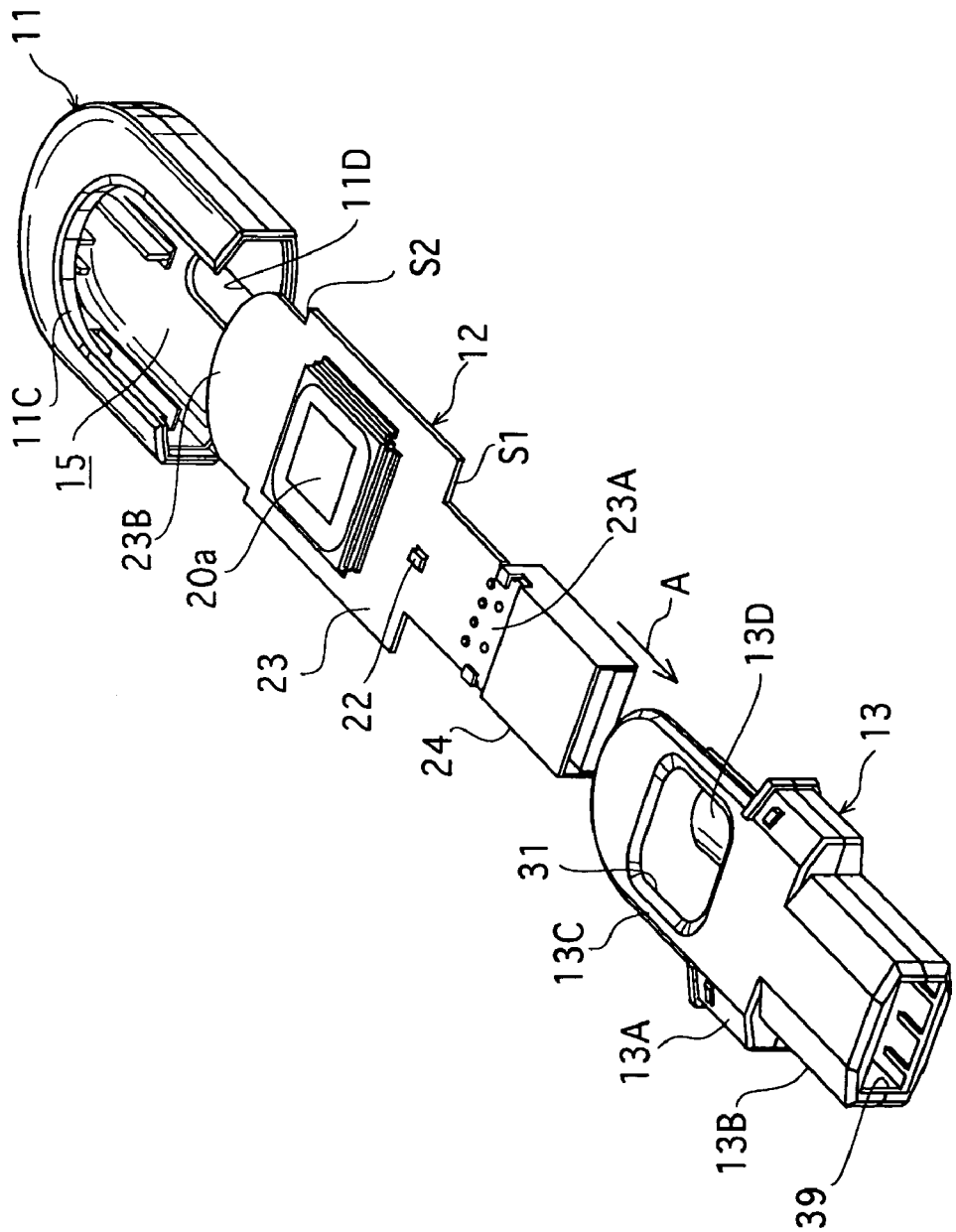
FIG. 4 is an exploded perspective view of the external storage apparatus 10.
Figure 5:
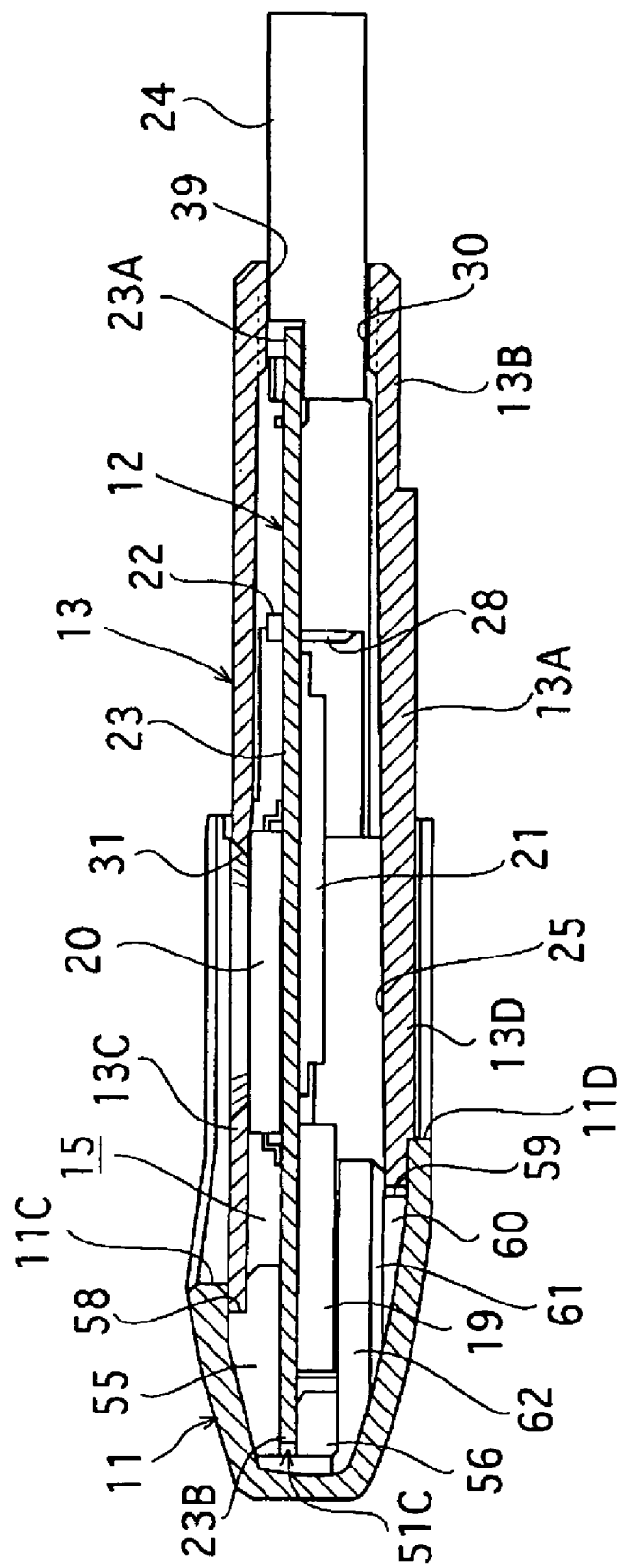
FIG. 5 is a side cross-sectional view of the external storage apparatus 10.

The memory substrate 12 is comprised of various electronic components such as a controller 19, fingerprint authentication image sensor 20, semiconductor memory 21 of flash memory etc., various electronic components such as a light-emitting diode 22 and crystal oscillator etc., and a connector 24 as an external connection terminal, mounted on, for example, a glass epoxy printed circuit board 23 (FIG. 4, FIG. 5).

One end in the longitudinal direction of the printed circuit board 23 is taken as a connector connection end 23A formed via a stepped section S1 and the other end is taken as a circular arc-shaped end 23B formed via a stepped section S2. The arc-shaped end surface of the circular arc-shaped end 23B corresponds to the internal shape of the main body 11 that houses it.

The semiconductor memory 21 records and stores data and functions as an external storage medium for the computer. Memory space of the semiconductor memory 21 can be configured in an arbitrary manner and may be split up into a secure region for which fingerprint authentication is required, and a free region for which fingerprint authentication is not required.

The controller 19 is a device for controlling operations of the external storage apparatus 10 and is mounted on the lower surface side of the printed circuit board 23 together with the semiconductor memory 21.

The connector 24 is made of a metal such as stainless steel, and has a plurality of connection terminals for connecting a computer and peripheral equipment arrayed inside. In this embodiment, the connector 24 is configured to conform to being a USB (Universal Serial Bus). As shown in FIG. 4 and FIG. 5, the connector 24 is mounted at the lower surface side of the printed circuit board 23 at the connector connection end 23A.

The image sensor 20 functions as a scanner for reading in fingerprints of users and is configured by a chip sensor equipped with a sensor surface 20a thereon. Further, the light-emitting diode 22 has a function for displaying the operating state of the external storage apparatus 10 as a light blinking. As shown in FIG. 4 and FIG. 5, the image sensor 20 and the light-emitting diode 22 are mounted on the upper surface side of the printed circuit board 23 on the opposite side to the mounting surface of the connector 24.

Next, a description is given of the configuration of the main body 11. The main body 11 is an injection molding made of, for example, a colored, opaque polycarbonate resin etc., and has a space 15 within for accommodating the memory substrate 12 and the substrate holder 13 (FIG. 4). One end of the main body 11 is open, and the other end is curved in an arc-shape so as to be closed (FIG. 6).

A welded surface 16 to be welded with a welding surface 26 (FIG. 10) of the substrate holder 13 described later is formed at an inner edge of the opening at one end of the main body 11 (FIG. 6, FIG. 7). A first cutout 11C and second cutout 11D formed in substantial U-shapes are formed at the curved upper surface and lower surface, respectively, of the main body 11 (FIG. 6, FIG. 7). The first cutout 11C has a broader width than the second cutout 11D and the forming depth of the first cutout 11C is set to be greater than the forming depth of the second cutout 11D (FIG. 5 to FIG. 7). The outer surface-side edges of the cutouts 11C and 11D are to be a tapered shape.

Support mechanisms for the memory substrate 12 and the substrate holder 13 housed within the space 15 of the main body 11 are configured at the space 15 of the main body 11.

First, a plurality of rib formations 51A, 51B, 51C and 51D for sandwiching the peripheral edge of the housed memory substrate 12 from a thickness direction (vertical direction) so as to support are provided as a support mechanism of the memory substrate 12 (FIG. 7).

Of these, the rib formations 51A and 51D positioned to the sides of the space 15 are comprised of a horizontal rib 52 for supporting a lower surface side edge of the memory substrate 12 and a vertical rib 53 formed so as to stand up in a vertical direction with respect to the projecting end of this horizontal rib 52 (FIG. 7). A support groove 54 for accommodating the stepped section S2 of the memory substrate 12 is formed at the vertical rib 53. Further, a pair of vertical ribs 55, 56 facing each other so as to sandwich the circular arc-shaped end 23B of the memory substrate 12 in a vertical direction are constructed at the rib formations 51B and 51C positioned centrally within the space 15 (FIG. 7).

On the other hand, a pair of first holding members 58 supporting an end of a protective plate 13C of a substrate holder 13 described later and a second holding member 59 supporting an end of a guide plate 13D of the substrate holder 13 are constructed within the space 15 as a support mechanism for supporting the substrate holder 13 (FIG. 7).

The first holding members 58 are provided between an inner surface side of an arc-shaped region of the first cutout 11C of the main body 11 and a pair of vertical ribs 55 that are integrally formed at this location, with groove width being substantially the same as the plate thickness of the protective plate 13C (FIG. 5, FIG. 7). The first holding members 58 may also be constructed so that the groove width gradually becomes small in the depth direction.

On the other hand, the second holding member 59 is provided between an inner surface side of an arc-shaped region of the second cutout 11D of the main body 11 and a horizontal rib 61 facing this via a vertical rib 60, with groove width being substantially the same as the plate thickness of the guide plate 13D (FIG. 5, FIG. 7). The second holding member 59 may also be constructed so that the groove width gradually becomes small in the depth direction.

Further, the vertical rib 62 formed on the upper surface of the horizontal rib 61 is constructed as a supporting rib coming into contact with the upper surface of the controller 19 mounted on the lower surface of the memory substrate 12 so as to support the memory substrate 12 (FIG. 5, FIG. 7).

A description is now given of a configuration of the substrate holder 13.

The substrate holder 13 is, for example, a smoke-colored, semi-transparent polycarbonate resin injection molding, within which a substrate insertion hole 25 for passing through a memory substrate 12 is formed (FIG. 5, FIG. 10). The overall length of the substrate holder 13 is shorter than the overall length of the memory substrate 12 and is configured so that connector 24 of the memory substrate 12 and circular arc-shaped end 23B project from each of the ends of the substrate holder 13 in the state of inserting the memory substrate 12 through the substrate through-hole 25 (FIG. 5).

The memory substrate 12 is inserted through the substrate through-hole 25 of the substrate holder 13 along the direction of arrow A in FIG. 4. In this event, as shown in FIG. 3 to FIG. 5, the connector 24 positioned at the front end as viewed from the insertion direction of the memory substrate 12 projects by a predetermined amount outwards from an opening 39 at one end of the substrate holder 13. The shape of the opening 39 is formed to correspond to the outer shape of the connector 24. The axial center of the opening 39 coincides with the axial center of the substrate through-hole 25.

The substrate holder 13 of this embodiment is comprised of a substrate support 13A, connector support 13B, protective plate 13C, and guide plate 13D (FIG. 8 to FIG. 10).

The substrate support 13A supports the memory substrate 12 inserted through the substrate through-hole 25, is equipped with a welding surface 26 welding with the main body 11 at an outer side, and constitutes the main body section of the substrate holder 13.

The inner surface of the substrate support 13A constitutes part of the substrate through-hole 25, with guide grooves 27 being formed in parallel respectively at the inner surface of each facing wall. The edges of the memory substrate 12 at both ends in the longitudinal direction fit into the guide grooves 27 so that the position of the memory substrate 12 in a width wise direction and thickness direction is restricted. The guide grooves 27 are formed continuously from the welding surface 26 constituting the open end of the substrate through-hole 25 to an innermost occluded wall section 28. The welding surface 26 is provided at the surface of one side of a flange 29 formed at the opening of the substrate support 13A, and a plurality of welding ribs 26A of predetermined shapes are provided positioned at the outer periphery about the whole of the welding surface 26 (FIG. 10). The front end of a supporting rib 30 is tapered in order to ensure of assembly with the memory substrate 12 (FIG. 5).

The connector support 13B is formed integrally with the substrate support 13A and has an inner hole substantially rectangular in cross-section containing the opening 39 supporting the connector 24 in a projecting state. The substrate through-hole 25 is then constructed from this inner hole and the inner surface of the substrate support 13A. The connector support 13B extends in a straight line from the inner edge of the occluded wall section 28 of the substrate support 13A to the opening 39. A plurality of supporting ribs 30 supporting the outer periphery of the connector 24 together with the inner peripheral surface of the opening 39 are provided in positions in the vicinity of the opening 39 (FIG. 8 to FIG. 10).

Next, the protective plate 13C is comprised of a broad plate-shaped member extending from the upper surface of the substrate support 13A towards the opposite side from the connector support 13B (FIG. 8 to FIG. 10). The forming width of the protective plate 13C corresponds to the forming width of the first cutout 11C of the main body 11. Further, the front end of the protective plate 13C is formed in an arc-shape corresponding to the shape of the first cutout 11C of the main body 11 (FIG. 8).

The protective plate 13C is held by the first holding members 58 of the main body 11 when the substrate holder 13 is being connected to the main body 11 (FIG. 5) As a result, the upper surface of the memory substrate 12 is concealed by the protective plate 13C, and the image sensing surface 20a of the image sensor 20 can be exposed to the outside via a window 31. The window 31 is formed at a position directly above the image sensor 20 on the memory substrate 12 (FIG. 3, FIG. 5).

The shape of the window 31 is by no means limited to being the rectangular shape shown in the drawings, and may also be circular, or another geometrical shape.

The window 31 is of a sufficient size to enable fingerprint authentication processing to be carried out appropriately when a user is inserting their finger within the window 31. In this embodiment, by making the peripheral edge of the window 31 a tapered surface, a difference corresponding to the thickness of the protective plate 13C is absorbed, and it is possible to carry out an appropriate fingerprint authentication processing operation in a straightforward and stable manner.

Further, the relative positions in the longitudinal direction between the window 31 and the image sensor 20 can be decided unequivocally by matching between the stepped section S1 of the memory substrate 12 and the occluded wall section 28 of the substrate support 13A.

On the other hand, the relative position in the vertical direction between the window 31 and the image sensor 20 can be set by the forming position of the guide groove 27 supporting a side edge section of the memory substrate 12.

In particular, in order to arrange the image sensor 20 at a position in the vicinity of the protective plate 13C, as a result of making the mounting surface for the image sensor 20 of the memory substrate 12 and the mounting surface for the connector 24 different, when the connector 24 is arranged at a position at the axial center of the substrate holder 13, the sensing surface 20a is arranged so as to be offset by an amount corresponding to the sum of the thickness of the printed circuit board 23 and the installation height of the image sensor 20 from the axially central position so as to be substantially flush with the lower surface (bottom surface) of the protective plate 13C.

In this embodiment, the guide grooves 27 are formed at positions offset to the side of the protective plate 13C from the axially central position of the substrate support 13A, and by constructing the substrate holder 13 in such a manner that the distances between the guide grooves 27 and the protective plate 13C are of a magnitude corresponding to the installation height of the image sensor 20, it is possible to position the image sensor 20 in the vicinity of the surface of the substrate holder 13 in a straightforward manner with a simple configuration.

Next, the guide plate 13D extends from the lower surface of the substrate support 13A in parallel with the protective plate 13C (FIG. 9, FIG. 10). While assembling the substrate holder 13 with the main body 11, the guide plate 13D has a function for engaging with the second cutout 11D of the main body 11 so as to restrict and guide in the direction of assembly. The guide plate 13D is comprised of a projecting surface section 33 formed to correspond with the shape of the second cutout 11D of the main body 11 and a base 34 supporting the inner peripheral surface of the second cutout 11D.

A description is now given of a configuration of the cap 14.

The cap 14 is composed of a colored, opaque, for example, polycarbonate resin, etc., and has a space 41 inside for accommodating the substrate holder 13 (FIG. 11). One end of the cap 14 is open, and the other end is curved in an arc-shape so as to be closed (FIG. 1 to FIG. 3, FIG. 11). The arc-shape of the other end of the cap 14 is taken to be substantially the same as the arc-shape of the occluded end of the main body 11. Further, the upper surface and the lower surface of the cap 14 are curved with curvatures corresponding to the upper surface and lower surface of the main body 11, respectively.

A first cutout 14C and second cutout 14D formed in substantial U-shapes are formed at the upper surface and lower surface, respectively, of the cap 14 (FIG. 1, FIG. 2, FIG. 11). The first cutout 14C has a broader width than the second cutout 14D and the forming depth of the first cutout 14C is set to be greater than the forming depth of the second cutout 14D. The outer surface-side edges of the cutouts 14C and 14D are taken to have a tapered shape.

The arc-shaped region of the first cutout 14C of the cap 14 is formed in the same shape as the arc-shaped region of the first cutout 11C of the main body 11, and the arc-shaped region of the second cutout 14D of the cap 14 is formed in the same shape as the arc-shaped region of the second cutout 14D of the main body 11.

A cover 42 of, for example, a transparent polycarbonate resin injection molding is attached to the first cutout 14C of the cap 14. The cover 42 has an outwardly curved shape on the outer-side surface, with part of its edge being fixed at the first cutout 14C of the cap 14. The region of the remainder of the peripheral edge of the cover 42 engages with the first cutout 11C of the main body 11 while fitting the cap 14 to the substrate holder 13 (FIG. 1). [0062]

On the other hand, the projecting surface section 33 of the guide plate 13D of the substrate holder 13 engages with the second cutout 14D of the cap 14 while attaching the cap 14 to the substrate holder 13 (FIG. 2).

A through-hole 40A and latch arm 40B for attaching a strap (not shown) are formed at the center of the front end of the cap 14 (FIG. 1, FIG. 2).

The cap 14 of this embodiment has a structure that divides into two parts comprised of an upper half 14A the first cutout 14C formed and a lower half 14B the second cutout 14D formed. These are then connected together using ultrasonic welding (FIG. 12, FIG. 13).

At the inner surface sides of the upper half 14A and lower half 14B, fitting projections 47 and insertion holes 48 fitting into each other in the event of assembly are provided at a plurality of locations, and welding sections 49A and 49B welded in the event of assembly are provided at a plurality of locations (FIG. 12, FIG. 13).

A projection 43 connected to a connecting surface 45 at an inner surface of the region for forming the first cutout 14C is formed at part of the peripheral edge of the cover 42. The cover 42 is then integrated with the upper half 14A as a result of fixing the projection 43 to a plurality of welding projections 46 on the connecting surface 45 through caulking.

The integration of the cover 42 and the upper half 14A may also be carried out using an adhesive.

Further, the latch arm 40B for attaching a strap is constructed by combining the upper half 14A and the lower half 14B and by appropriately providing a stepped section 40C (FIG. 12, FIG. 13) overlapping in a thickness direction of the latch arm 40B at the region for forming the latch arm 40B, so as to attain an effect of suppressing separation of the latch arm 40B in the event of pulling a strap.

Moreover, a rib formation 44 for guiding fitting to the substrate holder 13 and an auxiliary rib 50 supporting the connector 24 at the time of connection with the substrate holder 13 are provided inside the cap 14 (FIG. 12, FIG. 13) The rib formation 44 is provided at the lower half 14B, and the auxiliary rib 50 is provided at both the upper half 14A and the lower half 14B.

In the event of attachment of the substrate holder 13 and the cap 14, the extent of approach of the substrate holder 13 to the space 41 is restricted by the contact action of the open end of the main body 11 and the open end of the cap 14 (FIG. 1). Further, engaging projections 36 are formed at two locations on the upper surface and the lower surface respectively of the substrate holder 13 (FIG. 8 and FIG. 9), with engaging projections 37 then being formed at corresponding locations at the inner surface of the cap 14 (FIG. 11). A predetermined retaining effect and clicking sensation at the time of attachment and detachment is then achieved by climbing the engaging projections 36 and 37 over each other so as to fit.

The reason the positions of forming the engaging projections 36 (37) are not symmetrical at the upper surface and the lower surface is that when the engaging projections 36 (37) of the lower surface are provided to the side as with the upper surface, the amount of deformation of the cap 14 is small compared to the case of providing the engaging projections 36 (37) at the center, which is detrimental to ease of attachment and detachment, and reduces durability.

As with the configuration for the cap 14, it is also possible to give the main body 11 and the substrate holder 13 structures that divide into two parts in the vertical direction, but in this embodiment these have been given integrated structures. Here, parting lines in the vertical direction in each of the drawings showing the main body 11 and the substrate holder 13 show parting lines of the molds.

The external storage apparatus 10 of the embodiment configured as shown above is assembled as shown below.

First, after the upper surfaces of the memory substrate 12 and the substrate holder 13 are made to face each other in the same direction, as shown in FIG. 4, the memory substrate 12 is inserted through the substrate through-hole 25 of the substrate holder 13 along the direction of arrow A. In this event, as a result of fitting both side edges of the memory substrate 12 into the guide grooves 27 within the substrate through-hole 25, an appropriate assembly position is maintained for the memory substrate 12 with respect to the substrate holder 13, so as to enable favorable ease of assembly.

When the connector 24 of the memory substrate 12 is passed through the opening 39 of the substrate through-hole 25 a predetermined amount, the stepped section S1 of the memory substrate 12 comes into contact with the occluded wall section 28 within the substrate through-hole 25, so as to restrict advancement of the memory substrate 12 beyond this point. In this situation, the sensing surface 20$a$ of the image sensor 20 on the memory substrate 12 is aligned with the window 31 of the protective plate 13C of the substrate holder 13.

Next, the substrate holder 13 housing the memory substrate 12 and the main body 11 are positioned facing each other, and the circular arc-shaped end 23B of the memory substrate 12 and the protective plate 13C and guide plate 13D of the substrate holder 13 are assembled in the space 15 of the main body 11.

As a result, both edges of the memory substrate 12 are then guided into the space 15 with appropriate postures while being subjected to the guiding action of the horizontal ribs 52 of the rib formations 51A and 51D. The stepped section S2 of the memory substrate 12 then engages with the support mechanism 54, and the circular arc-shaped end 23B is supported so as to be held in the vertical direction by the rib formations 51B and 51C (FIG. 5). In this event, the circular arc-shaped end 23B may be made to come into contact with the inner surface of the occluded end of the main body 11.

Further, after the protective plate 13C and guide plate 13D of the substrate holder 13 are guided into the space 15 with an appropriate posture by the engaging action between the guide plate 13D and the second cutout 11D of the main body 11, the protective plate 13C and guide plate 13D of the substrate holder 13 are held in the vertical direction by the first holding member 58 and second holding member 59 within the space 15 of the main body 11 (FIG. 5).

Next, the welding surface 26 of the substrate holder 13 and the welded surface 16 of the main body 11 are welded together using ultrasonic welding techniques, so that the main body 11 and substrate holder 13 form a single body. The position for the memory substrate 12 is decided by holding the memory substrate 12 between the occluded wall section 28 of the substrate holder 13 and the rib formations 51A to 51D of the main body 11 in the longitudinal direction.

Further, positioning regulation in the thickness direction of the memory substrate 12 is carried out by the guide grooves 27 of the substrate holder 13 and the rib formations 51A to 51D of the main body 11.

According to this embodiment, the welding direction (assembly direction) of the substrate holder 13 with respect to the main body 11 is taken to be the extension direction of the protective plate 13C and guide plate 13D, i.e. a direction parallel with the arrow A in FIG. 4. It is therefore possible to minimize welding surface area between the main body 11 and substrate holder 13, and to both minimize the time of application of ultrasonic vibration in the event of welding and alleviate the load placed on the memory substrate 12 as a result.

When the external storage apparatus 10 of this embodiment is not in use, the cap 14 engages with the substrate holder 13, and the image sensor 20 and connector 24 are kept concealed (FIG. 1, FIG. 2). In this event, the space between the main body 11 and the cap 14 disappears due to the cover 42 of the cap 14 engaging with the first cutout 11C of the main body 11, and the sensing surface 20a of the image sensor 20 and the connector 24 can be protected from the infiltration of dust, etc.

Because the cover 42 of the cap 14 is transparent, the sensing surface 20a of the installed fingerprint authentication image sensor 20 can be visible via the cover 42 and the user is able to recognize that the fingerprint authentication function is installed.

Further, a curved shape is adopted for the cover 42. This gives favorable ability to maintain shape with little deformation with respect to external forces, and the internal sensing surface 20a can be reliably protected. As a result, reliability and durability of the external storage apparatus 10 can be ensured.

When the external storage apparatus 10 is in use, the external storage apparatus 10 is used as a result of removing the cap 14 as shown in FIG. 3 and plugging the connector 24 into a USB port of a computer (not shown). In the event that data files stored in the semiconductor memory 21 required for fingerprint authentication are to be utilized, a finger makes contact with the sensing surface 20a via the window 31 of the substrate holder 13, collation with pre-registered fingerprint patterns is carried out, and utilization of the file data is first possible from determining that the user is a rightful user. Fingerprint pattern registration data is stored, for example, in a predetermined region of the semiconductor memory 21, and fingerprint authentication processing is executed by the controller 19.

According to this embodiment, the image sensor 20 is arranged in the vicinity of the protective plate 13C of the substrate holder 13, and the sensing surface 20a is made to face directly below the window 31. Performing the fingerprint authentication operation is therefore straightforward and appropriate fingerprint authentication processing can therefore be carried out in a stable manner.

Further, the peripheral edge of the window 31 has a tapered surface, and it is therefore possible to efficiently guide the finger of the user to the sensing surface 20a. It is also possible to place a finger from all four sides of the window 31. It is also possible to achieve a function for dispersing pressing force with respect to the sensing surface 20a at the peripheral edge of the window 31 by tapering the peripheral edge of the window 31.

On the other hand, it is possible that excessive stress may be exerted on the external storage apparatus 10 in the event of handling or during fingerprint authentication operations, etc. In this case, when external force acting on the substrate holder 13 is transmitted directly to the internal memory substrate 12, this causes damage etc. to the memory substrate 12 and adversely affects reliability.

In this embodiment, the configuration is adopted where the protective plate 13C and guide plate 13D of the substrate holder 13 are held by the first holding members 58 and the second holding member 59, respectively. Stress such as compression, bending and torsion acting on the substrate holder 13 is therefore dispersed to the main body 11, external force is dissipated by the whole of the casing comprised of the case and substrate holder 13, and transmission of external force to the built-in memory substrate 12 is suppressed. This makes it possible to improve both reliability and durability.

Next, a description is given about another embodiment where using an external storage apparatus 10 on a desktop with a dedicated auxiliary member 100 in place of the external storage apparatus 10 of the above configuration that plugs directly into a USB port of a computer.

Figure 14:
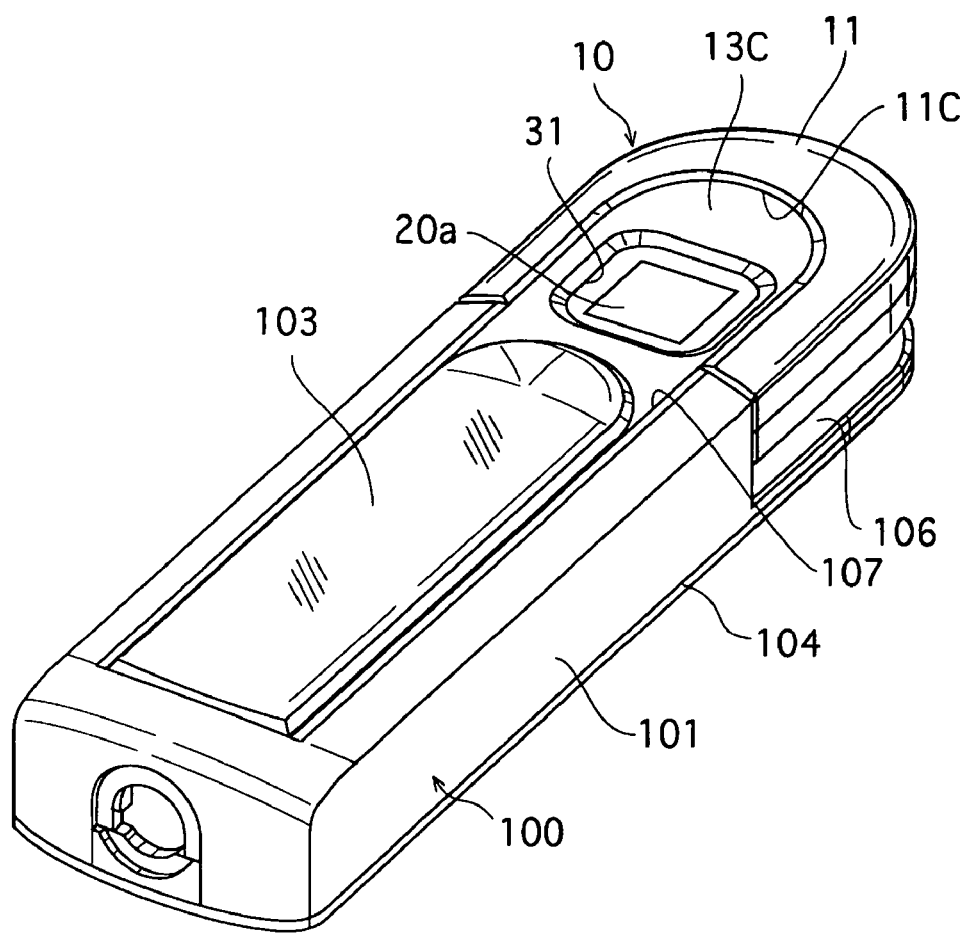
FIG. 14 is a perspective view showing a state in the event of insertion of the external storage apparatus 10 into a dedicated auxiliary member 100 with a sensing surface 20a being shown in a state of being revealed by a cover 103.
Figure 15:
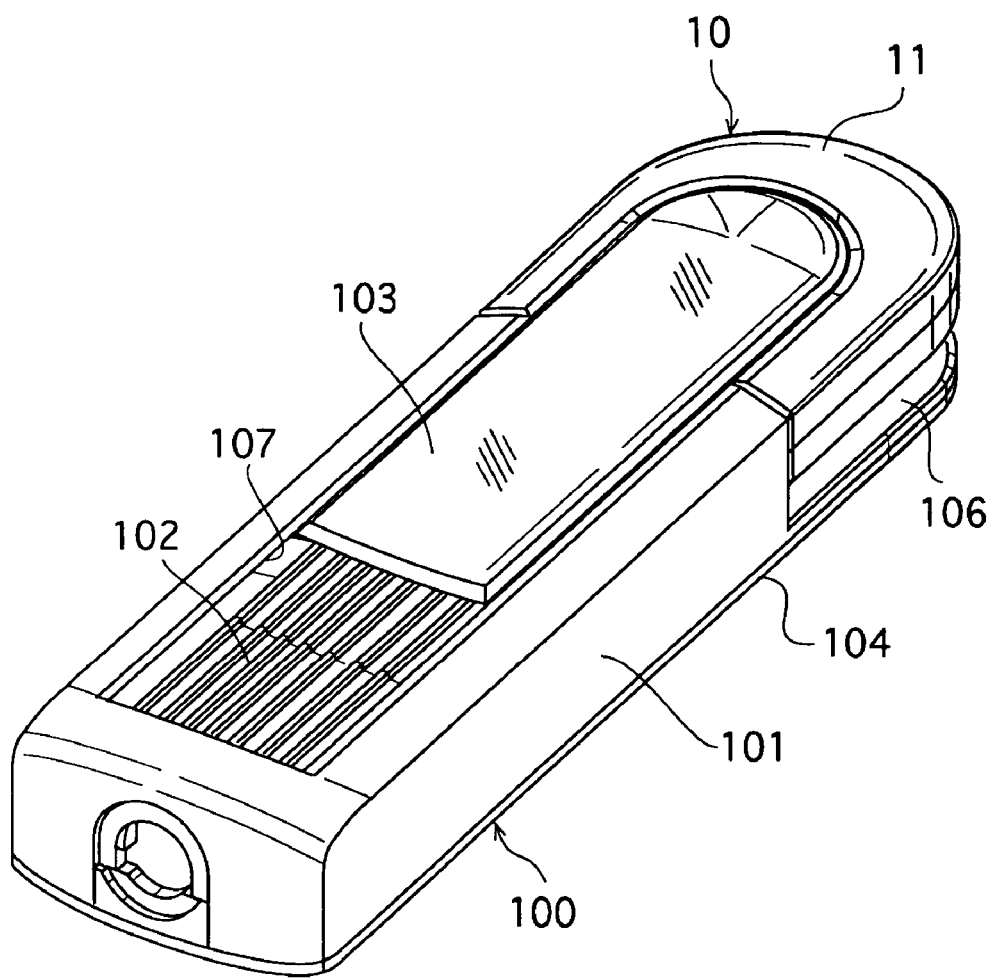
FIG. 15 is a perspective view showing a state in the event of insertion of the external storage apparatus 10 into the dedicated auxiliary member 100 with the sensing surface 20a being shown in a state of being concealed by the cover 103.
Figure 16:
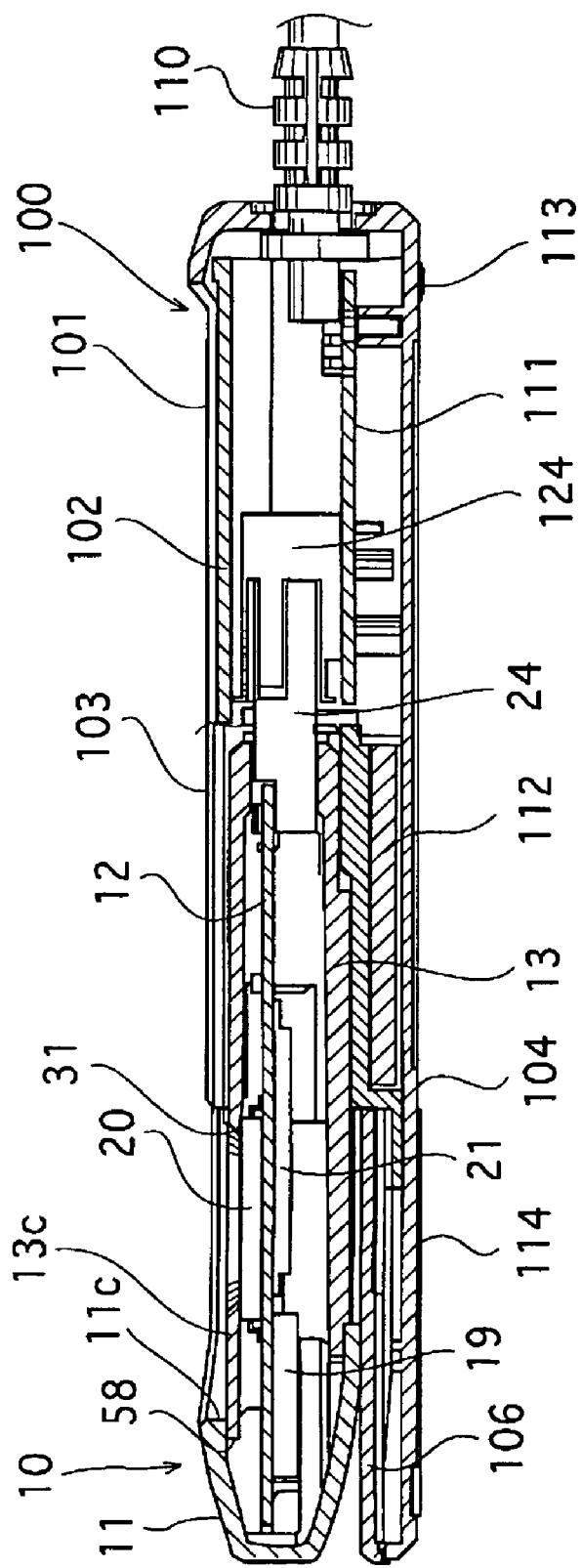
FIG. 16 is a side cross-sectional view of the state when the external storage apparatus 10 is inserted in the dedicated auxiliary member 100.
Figure 17:
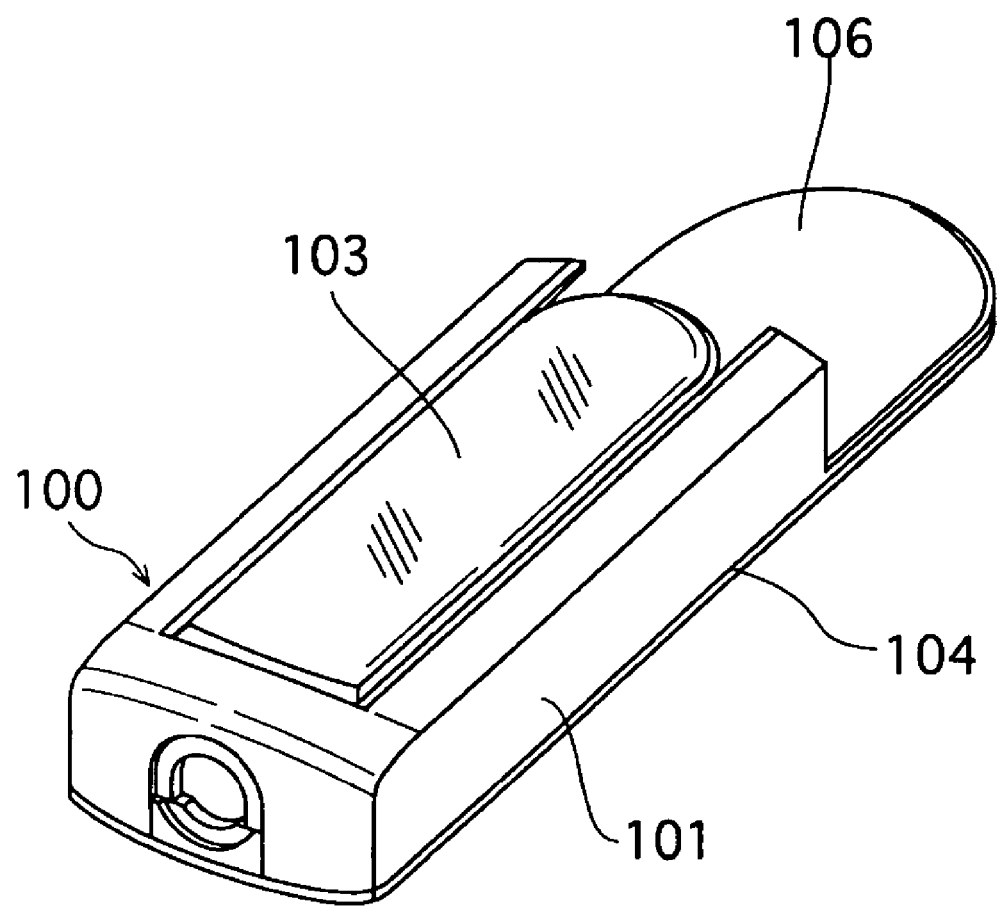
FIG. 17 is a perspective view of the dedicated auxiliary member 100.
Figure 18:
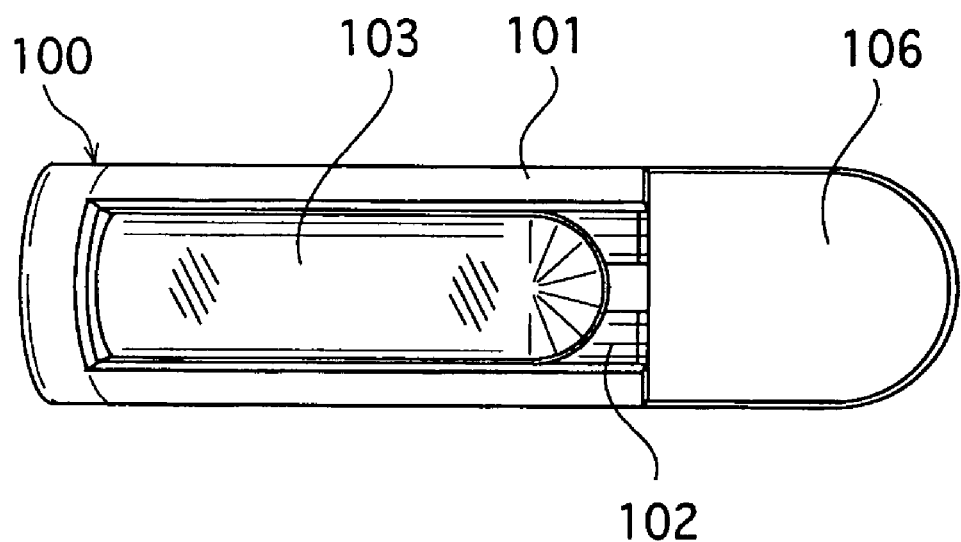
FIG. 18 is a plan view of the dedicated auxiliary member 100.
Figure 19:
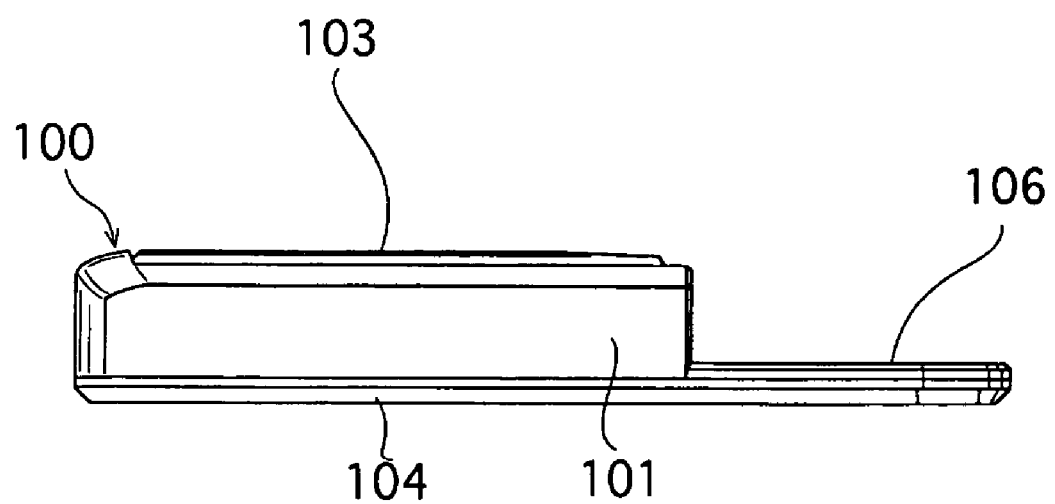
FIG. 19 is a side view of the dedicated auxiliary member 100.
Figure 20:
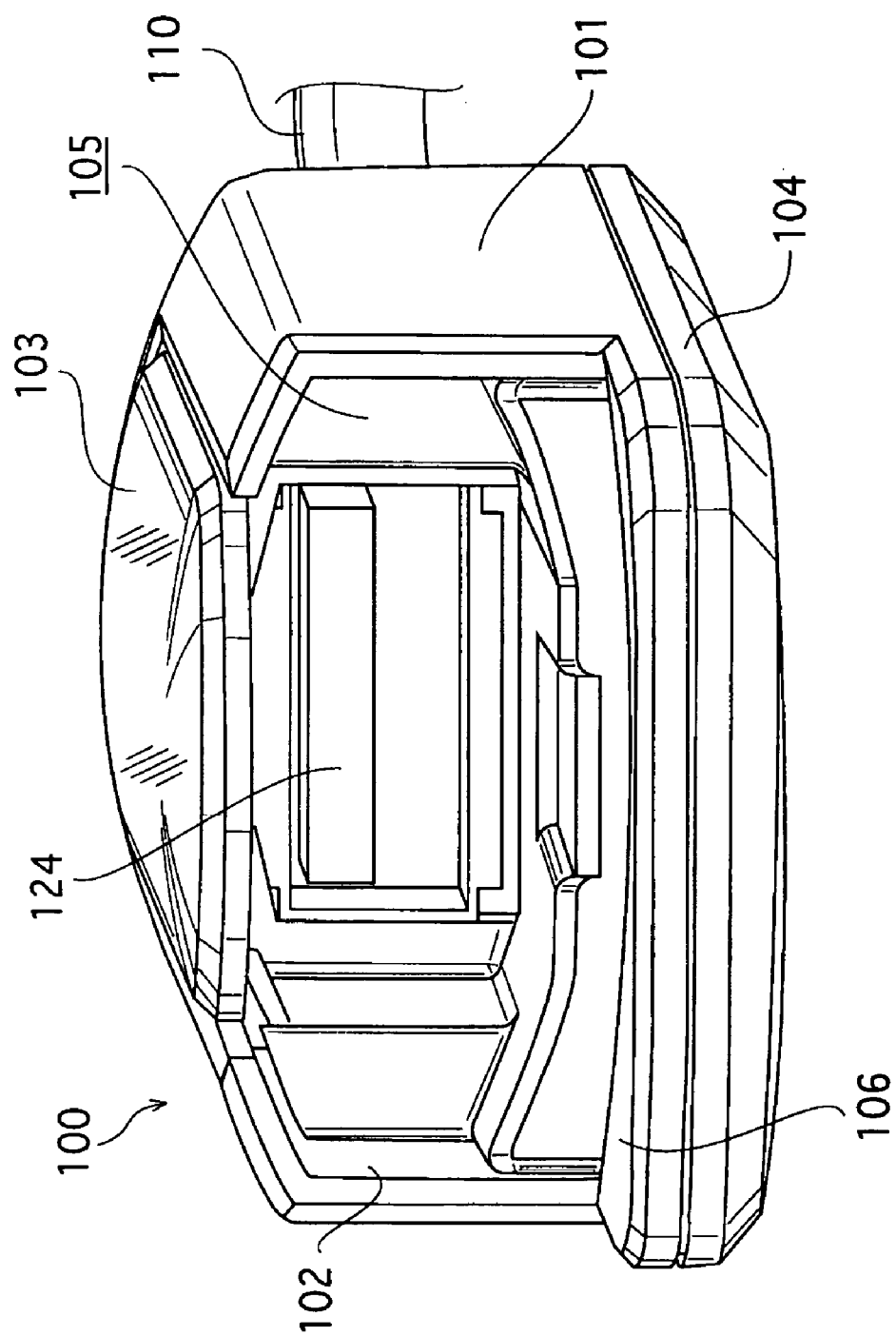
FIG. 20 is a perspective view showing an internal configuration of the dedicated auxiliary member 100.
Figure 21:
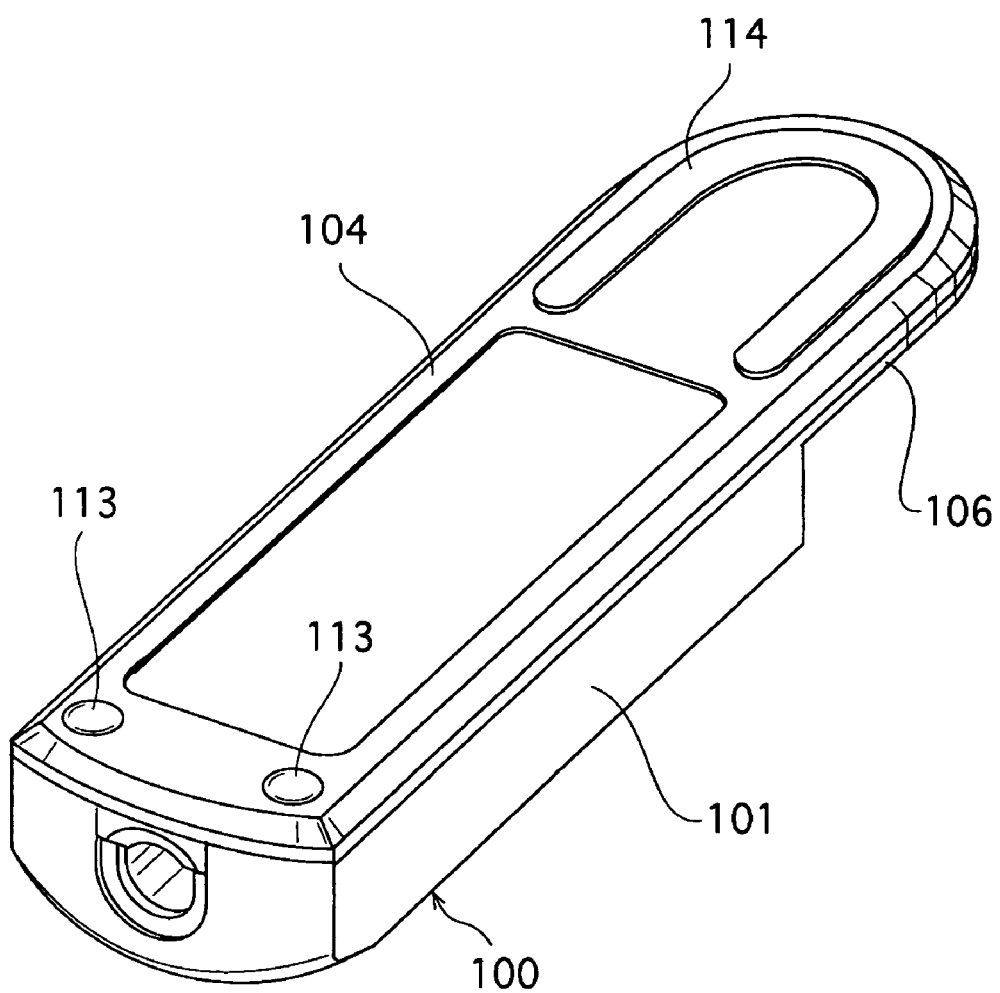
FIG. 21 is a bottom surface perspective view of the dedicated auxiliary member 100.
Figure 22:
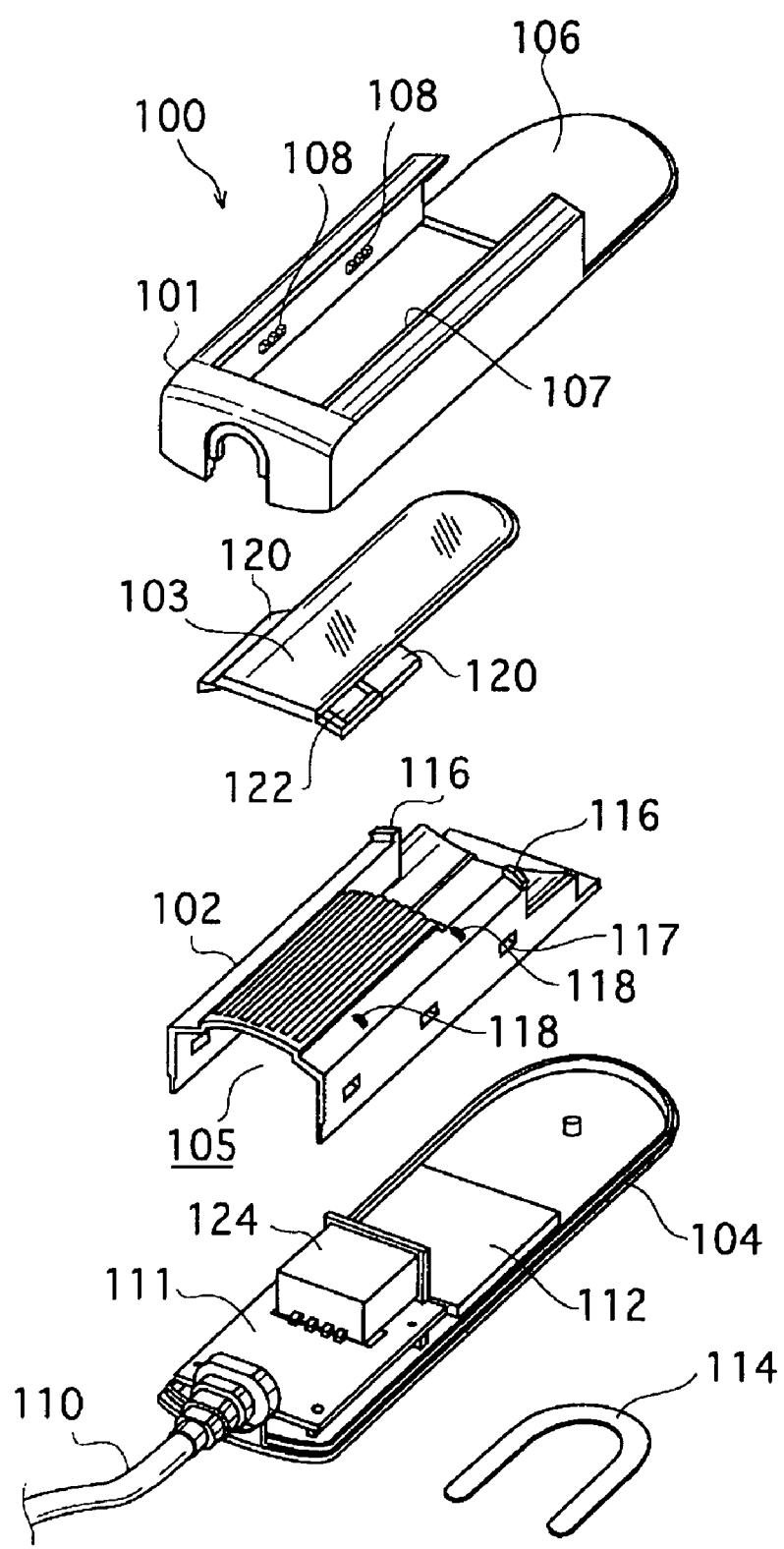
FIG. 22 is an exploded perspective view of the dedicated auxiliary member 100.

FIG. 14 and FIG. 15 are perspective views showing cross-sectional views of the state when the external storage apparatus 10 is inserted in the dedicated auxiliary member 100, FIG. 16 is a side cross-sectional view thereof, FIG. 17 is a perspective view of the dedicated auxiliary member 100, FIG. 18 is a plan view thereof, FIG. 19 is a side view thereof, FIG. 20 is a perspective view showing the internal configuration thereof, FIG. 21 is a perspective view of the bottom surface thereof, and FIG. 22 is an exploded perspective view thereof.

The dedicated auxiliary member 100 is equipped with a connecting cable 110 with one end connected to the USB port of the computer, with a connection terminal 124 to which the other end of the connecting cable 110 is connected provided within the dedicated auxiliary member 100 (FIG. 16, FIG. 20, FIG. 22). The substrate holder 13 of the external storage apparatus 10 is inserted into an insertion opening 105 of the dedicated auxiliary member 100, and connection to the computer is possible by connecting the connector 24 to the connection terminal 124. As a result, it is possible to use the external storage apparatus 10 on a desktop.

As shown in FIG. 22, the dedicated auxiliary member 100 is comprised of the first main body section 101, second main body section 102, cover 103, and base member 104.

Figure 23:
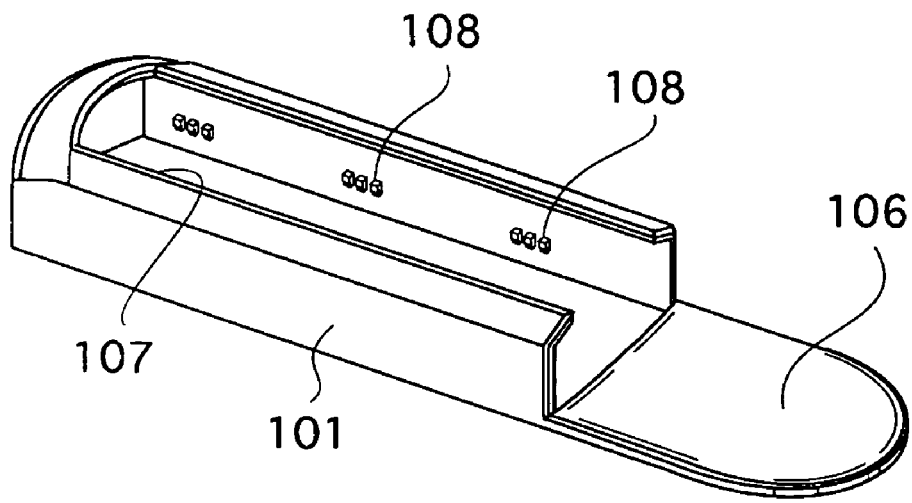
FIG. 23 is a perspective view of the upper surface side of a first main body section 101.
Figure 24:
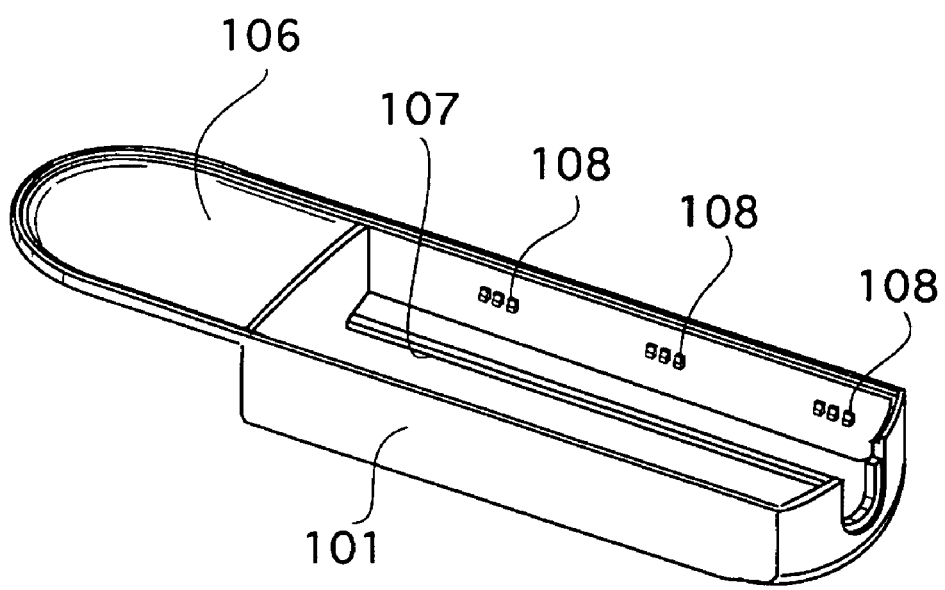
FIG. 24 is a perspective view of the bottom surface side of the first main body section 101.
Figure 25:
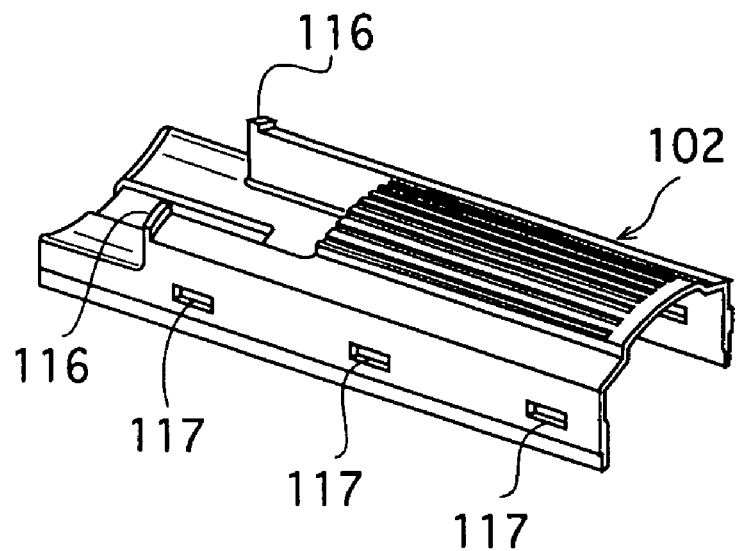
FIG. 25 is a perspective view of the upper surface side of a second main body section 102.
Figure 26:
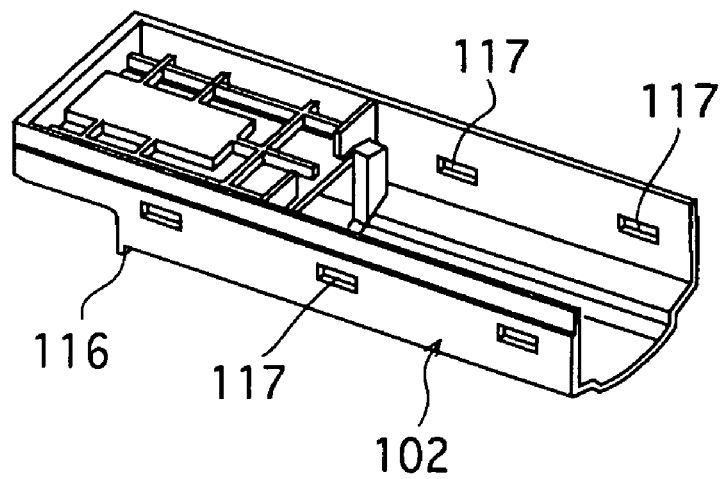
FIG. 26 is a perspective view of the bottom surface side of the second main body section 102.
Figure 27:
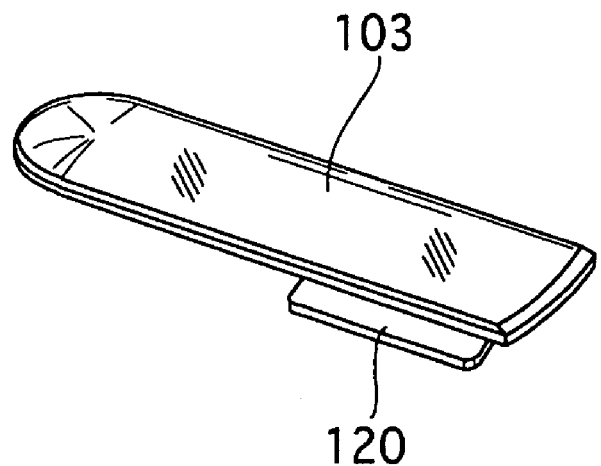
FIG. 27 is a perspective view of the upper surface side of the cover 103.
Figure 28:
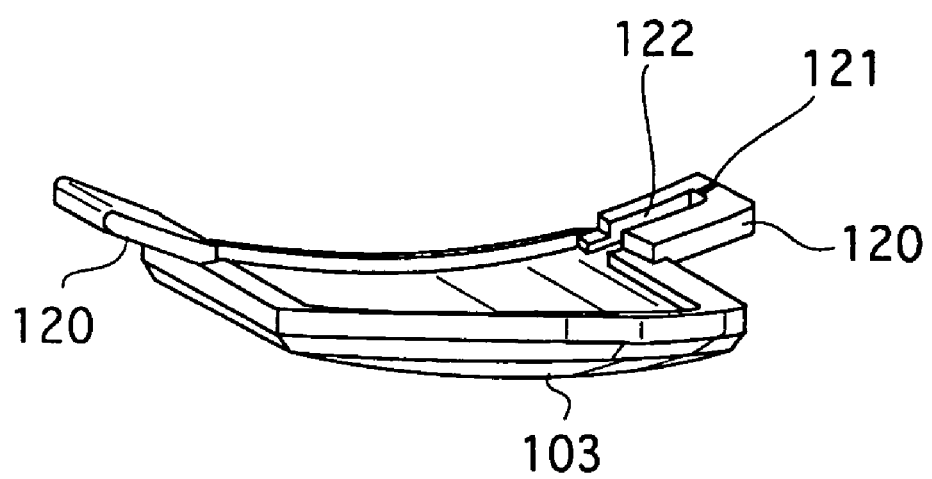
FIG. 28 is a perspective view of the bottom surface side of the cover 103.
Figure 29:
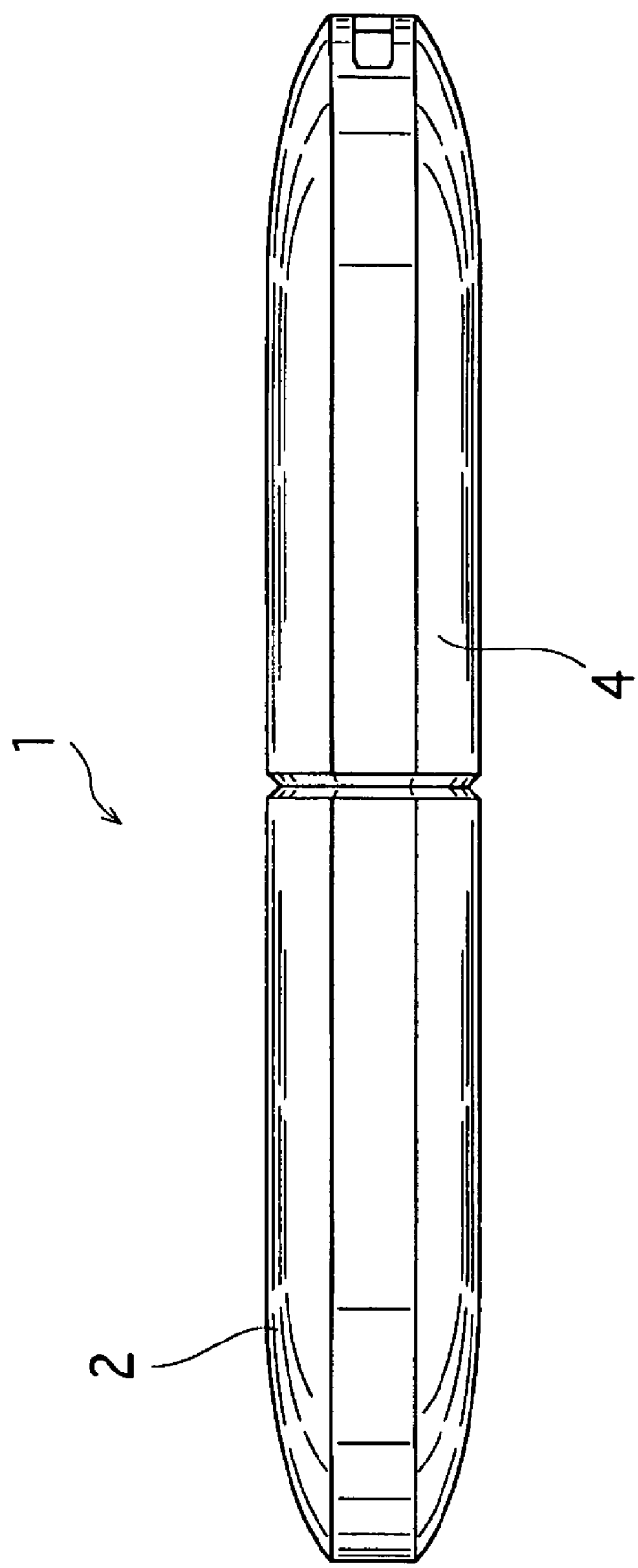
FIG. 29 is a side cross-sectional view of an external storage apparatus 1 of the related art.
Figure 30:
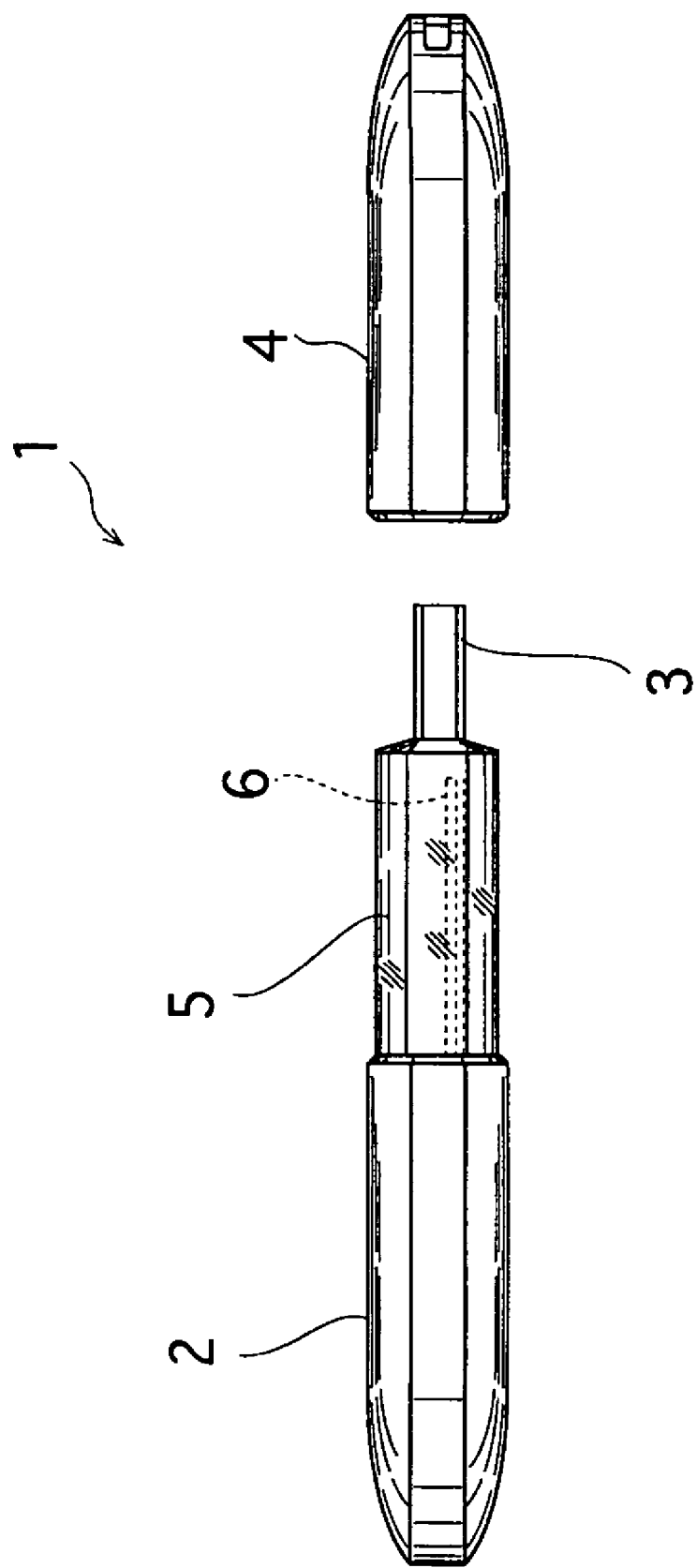
FIG. 30 is a side view of the external storage apparatus 1 of the related art with a cap 4 removed.
Figure 31:
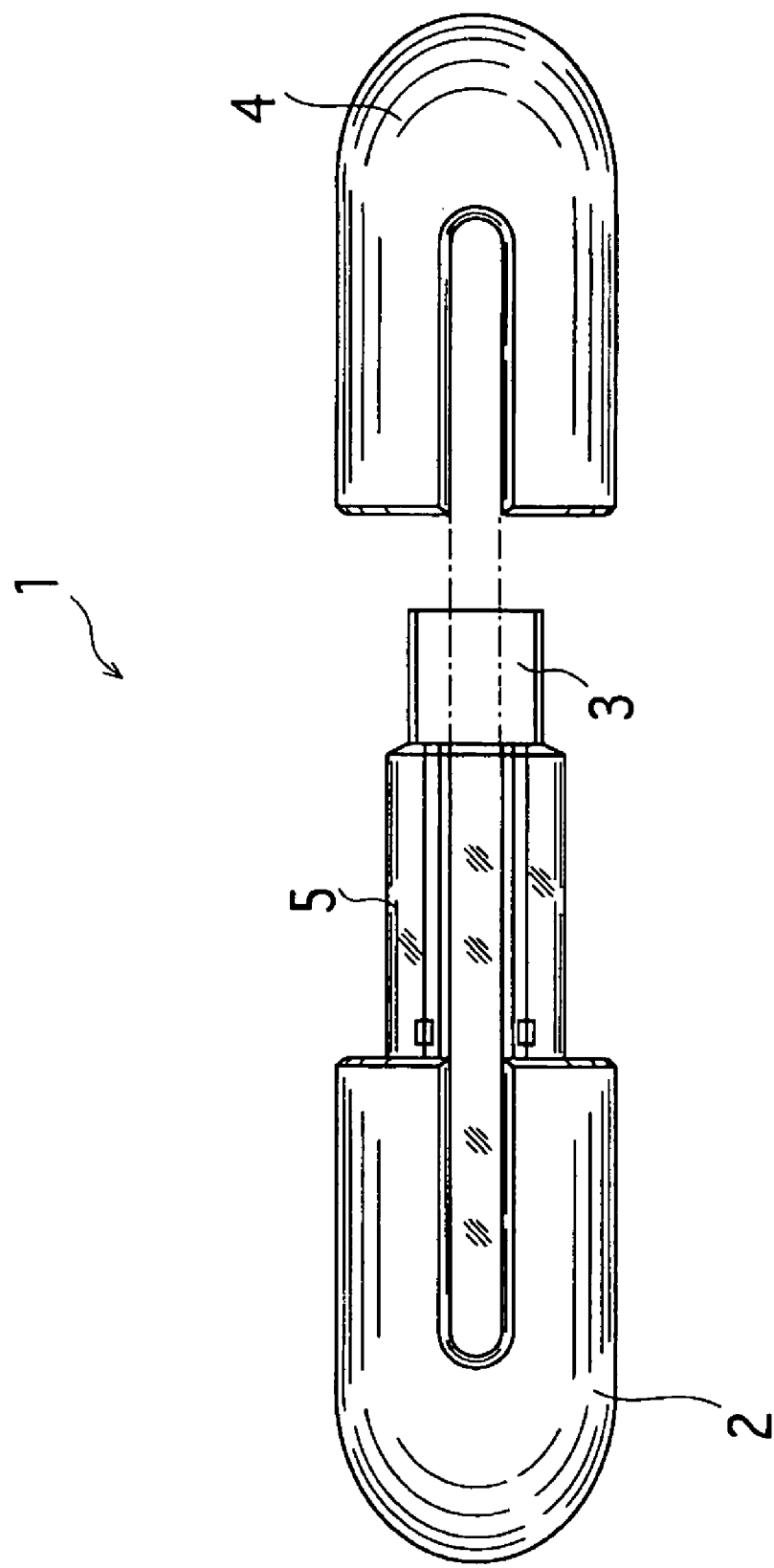
FIG. 31 is a plan view of the same.

FIG. 23 and FIG. 24 are perspective views showing the configuration of the first main body section 101, FIG. 25 and FIG. 26 are perspective views showing the configuration of the second main body section 102, and FIG. 27 and FIG. 28 are perspective views showing the configuration of the cover 103.

The first main body section 101 constructs the external appearance of the dedicated auxiliary member 100, and is integrally formed by welding etc. to the base member 104. The first main body section 101 has a seating section 106 supporting the substrate holder 13 of the external storage apparatus 10 in a lying down position. An opening 107 is formed at the upper surface of the first main body section 101, and the cover 103 is attached in a freely sliding manner at this opening 107. The width to which the opening 107 is formed is taken to be the same as the width to which the first cutout 11C of the main body 11 of the external storage apparatus 10 is formed. The second main body section 102 is integrated so as to overlap with the first main body section 101.

The second main body section 102 constructs the insertion opening 105 of the dedicated auxiliary member 100. A stopper 116 coming into contact with a wing section 120 of the cover 103 so as to restrict sliding amount is provided at the upper surface of the second main body section 102. A plurality of insertion holes 117 into which pawls 108 formed projecting from both sidewall sections of the first main body section 101 fit are provided at the both sidewall sections of the second main body section 102.

The cover 103 is, for example, a transparent polycarbonate resin injection molding having a curved shape. The cover 103 has a function for revealing and concealing the sensing surface 20a of the external storage apparatus 10 inserted at the insertion opening 105. An arc-shape of the front end of the cover 103 is constructed so as to engage with the arc-shaped region of the first cutout 11C of the main body 11 of the external storage apparatus 10.

The wing section 120 is provided so as to be held between the first main body section 101 and the second main body section 102 in a freely sliding manner at both ends of the cover 103. A positioning recess 121 engaging with a positioning projection 118 provided at the upper surface of the second main body section 102 is formed at the lower surface of one of these wing sections 120 (FIG. 28). As shown in FIG. 14 and FIG. 15, the positioning projection 118 is provided at a position of engagement with the positioning recess 121 at a position revealing and a position concealing the cover 103. An opening 122 for increasing deformability of the wing section 120 is formed at the part where the positioning recess 121 of the wing section 120 is formed.

A wiring board 111 on which the connecting cable 110 and the connection terminal 124 are mounted is fixed to the base member 104 using, for example, screws, and a weight 112 for providing a feeling of stability during handling is attached. Feet 113 are formed at the bottom surface of the base member 104, to which rubber 114 is adhered to prevent slipping (FIG. 21).

As shown in FIG. 14, the dedicated auxiliary member 100 of the above configuration is such that the external storage apparatus 10 is supported in a lying position with the sensing surface 20a facing upwards on the seating section 106. Fingerprint authentication operations are therefore easy to carry out in the event of using the external storage apparatus 10 while at the same time achieving appropriateness of the authentication processing. Further, handling and stability of the authentication operation is improved compared with the case of connecting the external storage apparatus 10 directly to a computer, and the load placed on the connector 24 is alleviated.

Moreover, when authentication processing is not carried out, the cover 103 of the dedicated auxiliary member 100 can be slid to a position where the sensing surface 20a is concealed, as shown in FIG. 15. In this event, because the cover 103 is transparent, the sensing surface 20a of the installed fingerprint authentication image sensor 20 can be visible via the cover 103 and the user is able to recognize that the fingerprint authentication function is installed.

Further, by concealing the sensing surface 20a and the protective plate 13C using the cover 103, damage to the sensor 20 or the memory substrate 12 due to falling objects or careless bumping is prevented.

In the above, a description is given of embodiments of the present invention but the present invention is by no means limited in this respect and various modifications are possible based on the technological concept of the present invention.

For example, in the above embodiment, the cover 42 of the cap 14 is provided as a separate component, and is fixed to the cap 14 by welding or bonding but it is also possible form the cover 42 and the cap 14 (upper half 14A) at the same time using two-color molding techniques.

INDUSTRIAL APPLICABILITY

As described above, according to the external storage apparatus of the present invention, appropriate, stable fingerprint authentication processing is possible while preventing the configuration from becoming complex and heavy, so as to bring about superior reliability and durability.

The invention claimed is:

1. An external storage apparatus comprising:
a main body;
a memory substrate, on which at least a semiconductor memory is mounted, having an external connection terminal at one end thereof;
a substrate through-hole through which said memory substrate is inserted to be held;
a substrate holder fixing said memory substrate to said main body in a state that said external connection terminal projected outwards from one end open portion of said substrate through hole;
a cap for protecting said external connection terminal and freely attachable and detachable to and from said substrate holder;
said external storage apparatus characterized in that:
on said memory substrate, an image sensor provided with a sensing surface at upper portion thereof for fingerprint authentication is mounted at a surface on an opposite side to a surface mounted said external connection terminal;
said substrate holder has a protective plate on which a window positioned directly above said image sensor is formed so as to expose a sensing surface to outside;
holding section for holding said protective plate in a vertical direction is provided within said main body.

2. The external storage apparatus according to claim 1, characterized in that said substrate holder has a welded surface to be welded to said main body, a welded direction with respect to said main body is a extension direction of the protective plate.

3. The external storage apparatus according to claim 1, characterized in that a peripheral edge of said window is formed in a tapered shape.

4. The external storage apparatus according to claim 1, characterized in that a cover is attached to said cap for concealing said window when fitting said cap to said substrate holder and a cutout portion for engaging with said cover along a attachment direction is provided in said main body.

5. The external storage apparatus according to claim 4, characterized in that said cover has a curved shape.

6. The external storage apparatus according to claim 4, characterized in that said cover has a transparent property.

7. The external storage apparatus according to claim 1 further comprising an auxiliary member connected to said external connection terminal for joining said external connection terminal into a connection port of a computer;
said external storage apparatus characterized in that:
said auxiliary member has
a main body into which said substrate holder is inserted,
a seating section supporting said substrate holder in a lying down position, and
a cover for concealing said window in a freely sliding manner.

* * * * *